United States Patent
Momotsu et al.

(10) Patent No.: US 7,407,331 B2
(45) Date of Patent: Aug. 5, 2008

(54) OPTICAL BRANCHING MODULE AND OPTICAL CABLE BOOT

(75) Inventors: Toshihiro Momotsu, Sakura (JP); Koichi Katayose, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/953,578

(22) Filed: Dec. 10, 2007

(65) Prior Publication Data
US 2008/0138018 A1  Jun. 12, 2008

(30) Foreign Application Priority Data

| Dec. 11, 2006 | (JP) | ............................. 2006-333743 |
| Jul. 24, 2007 | (JP) | ............................. 2007-192497 |

(51) Int. Cl.
*G02B 6/36* (2006.01)
*G02B 6/38* (2006.01)
*G02B 6/00* (2006.01)

(52) U.S. Cl. ........................... 385/69; 385/86; 385/135; 385/136; 385/137

(58) Field of Classification Search .................. 385/69, 385/76, 86–87, 134–137
See application file for complete search history.

(56) References Cited

U.S. PATENT DOCUMENTS

| 5,933,557 | A | * | 8/1999 | Ott ............................. 385/86 |
| 5,953,476 | A | * | 9/1999 | Abe ............................ 385/87 |
| 6,314,229 | B1 | * | 11/2001 | Sasaki et al. ................ 385/135 |
| 2004/0234209 | A1 | * | 11/2004 | Cox et al. ..................... 385/86 |

FOREIGN PATENT DOCUMENTS

| JP | 8-122567 A | 5/1996 |
| JP | 2004-62020 A | 2/2004 |

* cited by examiner

*Primary Examiner*—Frank G Font
*Assistant Examiner*—Michael P Mooney
(74) *Attorney, Agent, or Firm*—Sughrue Mion, PLLC

(57) ABSTRACT

An optical branching module includes a case from which cables are drawn out and an output-cable fixing member attached onto the case by insertion. Optical cables are inserted into cable insertion holes of the optical cable fixing member, and the optical cables are fixed to the optical cable fixing member by an adhesive applied from an opening portion. The optical branching module includes a cable boot configured not to be bent in a radius of curvature smaller than the allowed radius of curvature of the optical cables.

12 Claims, 23 Drawing Sheets

OPTICAL BRANCHING MODULE AND OPTICAL CABLE BOOT

This application claims priority from Japanese Patent Applications No. 2006-333743, filed on Dec. 11, 2006, and No. 2007-192497, filed on Jul. 24, 2007, the entire contents of which are incorporated by reference herein.

BACKGROUND OF THE INVENTION

1. Field of the Invention

Apparatuses consistent with the present invention relate to an optical branching module that performs optical signal processing such as optical branching for an optical signal inputted by an optical cable on an input side, and outputs optical signals subjected to optical signal processing by optical cables on an output side, and particularly, to an optical splitter module that contains an optical splitter and to an optical connector boot.

2. Description of the Related Art

Optical Branching Module

In general, in an optical branching module, for example, cables on an input side and an output side are drawn out of a case. The cables drawn out of the optical branching module are fixed thereto so as not to cause a malfunction such as a joint failure even if pulling force is applied to the cables. FIG. 1 and FIG. 2 show a related fixing structure of the cables.

In FIG. 1 and FIG. 2, one end of each of a plurality of cables 500 is housed in a case 501, and other ends thereof are drawn out of the case 501. End portions of the cables 500 housed in the case 501 are subjected to step peeling. Such portions of the plurality of cables 500, which are subjected to the step peeling, are coated with a double-sided adhesive tape 502, with the cables in a state of being spaced from one another. The portions of the plurality of cables 500, which are coated with the double-sided adhesive tape 502, are placed between two columns of positioning pins 503 of the case 501, and a lower surface of the double-sided adhesive tape 502 is pasted onto the case 501. A region between the two columns of positioning pins 503 of the case 501 is covered with a protection cover 504 from the above, and an upper surface of the double-sided adhesive tape 502 is pasted onto the protection cover 504. The force for fixing the cables 500 in the case 501 is obtained by adhesive force of the double-sided tape 502.

In the related art optical branching module, the adhesive force of the double sided tape 502 is not sufficient with respect to magnitudes of various pulling forces applied to the cables 500. In particular, the adhesive force of the double-sided adhesive tape 502 deteriorates in an outdoor environment, and accordingly, the fixing force thereof decreases.

Optical Cable Boot

Onto a joint portion between an optical connector such as the optical branching module and optical fibers or between the optical branching module and optical cables, an optical cable boot for the optical connector (hereinafter referred to as an optical connector boot) is attached in order to reduce an optical transmission loss caused by side thrust increased when the optical fibers are curved.

A related optical connector boot is disclosed in Japanese Patent Laid-Open Publication No. H8-122567 (published in 1996). FIGS. 3A and 3B are schematic views showing an outline of the related optical connector boot: FIG. 3A shows a state where no load is applied to the optical connector boot; and FIG. 3B shows a state where a load is applied thereto downward toward the right in the drawing.

As shown in FIG. 3A, slits 335 are formed at a predetermined pitch P in an optical connector boot 301. With regard to the slits 335, two thereof which are perpendicular to a length direction of the optical connector boot 301 and open outward symmetrically with respect to each other make a pair, and a plurality of the pairs form the slits 335. Moreover, the slits 335 are formed at a constant width with respect to a depth direction when coupling portions 333 are taken as bottoms.

When each optical fiber (not shown) is coupled to a connector plug (not shown), and is fixed to a predetermined device, the optical fiber is curved downward owing to its own weight. In this case, the optical connector boot 301 is attached onto the joint portion, whereby a curvature radius of the curved optical fiber is increased, and the side thrust is reduced.

Then, when the optical connector boot 301 is attached onto the optical fibers (not shown), and is assembled to the connector plug (not shown), the optical connector boot 301 is gently curved downward as shown by dotted lines of FIG. 3B owing to the weight of the optical fibers.

In the related art optical connector boot, the width of the slits is constant with respect to the depth direction thereof. Accordingly, when a pulling load is applied to a direction (downward in FIG. 3) of 90 degrees with respect to a direction where the optical connector is attached/detached onto/from the optical fibers, the optical fibers are not curved into a shape shown by the dotted lines of FIG. 3B, but are positionally shifted therefrom in a shearing direction at the coupling portions 335 of the slits 335, the optical fibers are bent at an acute angle, and the side thrust is increased, resulting in a problem that the optical transmission loss is increased.

In the related optical branching module, the adhesive force of the double sided tape 502 is not sufficient with respect to magnitudes of various pulling forces applied to the cables 500. In particular, the adhesive force of the double-sided adhesive tape 502 is deteriorated in an outdoor environment, and accordingly, the fixing force thereof is decreased.

SUMMARY OF THE INVENTION

In accordance with exemplary embodiments of the present invention, an optical branching module in which the fixing force for the cables is strong can be provided.

In accordance with an exemplary embodiment, the optical branching module may include: a case from which optical cables are drawn out, the case having a case body, and a cover that closes an opening surface of the case body; and a cable fixing member attached onto the case, the cable fixing member including cable insertion holes into which the optical cables are inserted, and an opening portion that opens the cable insertion holes, wherein end sides of the optical cables are inserted into the cable insertion holes of the cable fixing member; and at least portions of the optical cables, the spots including strength fibers, are adhered onto the cable fixing member by an adhesive applied from the opening portion of the cable fixing member.

In accordance with an exemplary embodiment of the present invention, an optical connector boot can be provided, which, even in the case of being applied with the pulling force in the direction of 90 degrees with respect to a cabling direction of the optical fibers or the optical cables, is bent at a predetermined spot, and is gently curved as a whole, thus making it possible to moderate the bending of the optical fibers, and to reduce the optical transmission loss.

In accordance with another technical aspect of the present invention, the optical connector boot includes: a unit structure having a first cover portion having a cylindrical shape, in which a plurality of optical fibers are inserted through an insertion hole formed in an inside of a second cover portion having a cylindrical shape, in which the plurality of optical fibers are inserted through an insertion hole formed in an inside, and of a first coupling portion that integrally couples the first cover portion and the second cover portion to each other so as to be freely swingable; and a fixing portion having a cylindrical shape and being formed integrally with the first cover portion or the second cover portion, wherein a plurality of the unit structures are adjacently coupled to one another along an axial direction of the optical fibers; between the unit structures adjacent to each other, the first cover portion of the one-side unit structure and the second cover portion of the other-side unit structure are integrally coupled to each other through a second coupling portion so as to be freely swingable; a pair of first slits gradually expanded from the first coupling portion toward an outer circumference are formed while sandwiching the first coupling portion therebetween; and a pair of second slits expanded from the second coupling portion toward an outer circumference are formed on both sides while sandwiching the second coupling portion therebetween.

BRIEF DESCRIPTION OF THE DRAWINGS

The above and other features and advantages of the present invention will become more apparent by describing in detail exemplary embodiments thereof with reference to the attached drawings in which:

FIG. 3A is a view before a load is applied to the optical connector boot; and FIG. 3B is a view where the load is applied thereto.

FIG. 10A is a view before the load is applied to the optical connector boot; and FIG. 10B is a view where the load is applied thereto.

FIG. 12A shows measurement results when a wavelength of incident light is 1310 nm; FIG. 12B shows measurement results when the wavelength of the incident light is 1550 nm; and FIG. 12C shows measurement results when the wavelength of the incident light is 1650 nm.

FIG. 13A shows measurement results when the wavelength of the incident light is 1310 nm; FIG. 13B shows measurement results when the wavelength of the incident light is 1550 nm; and FIG. 13C shows measurement results when the wavelength of the incident light is 1650 nm.

DESCRIPTION OF THE EXEMPLARY EMBODIMENTS

First Exemplary Embodiment

Figure 4:
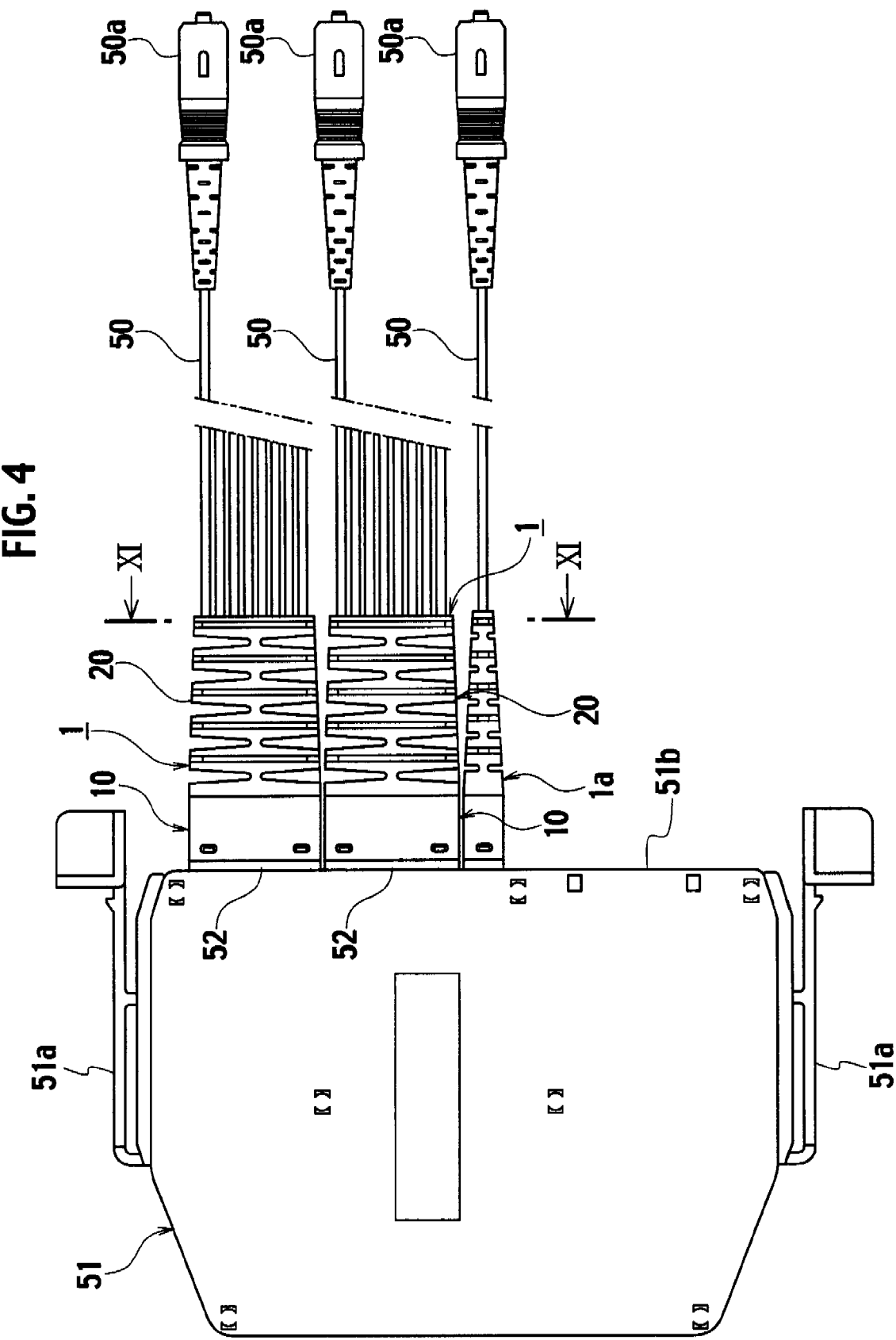
FIG. 4 is a schematic configuration view showing a state where an optical connector boot according to a first exemplary embodiment of the present invention is employed.
Figure 5:
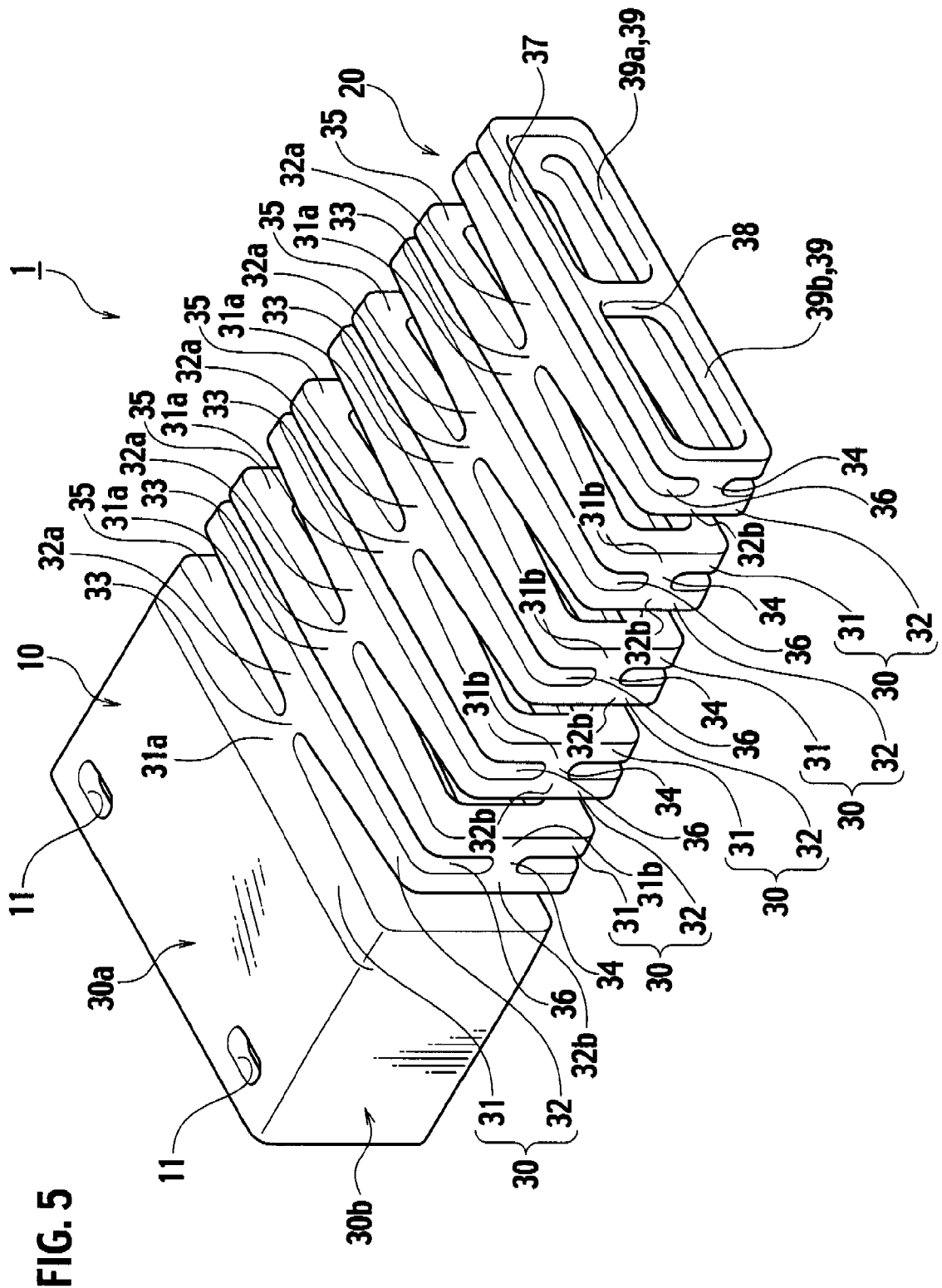
FIG. 5 is a perspective view of the optical connector boot according to the first exemplary embodiment of the present invention.
Figure 6:
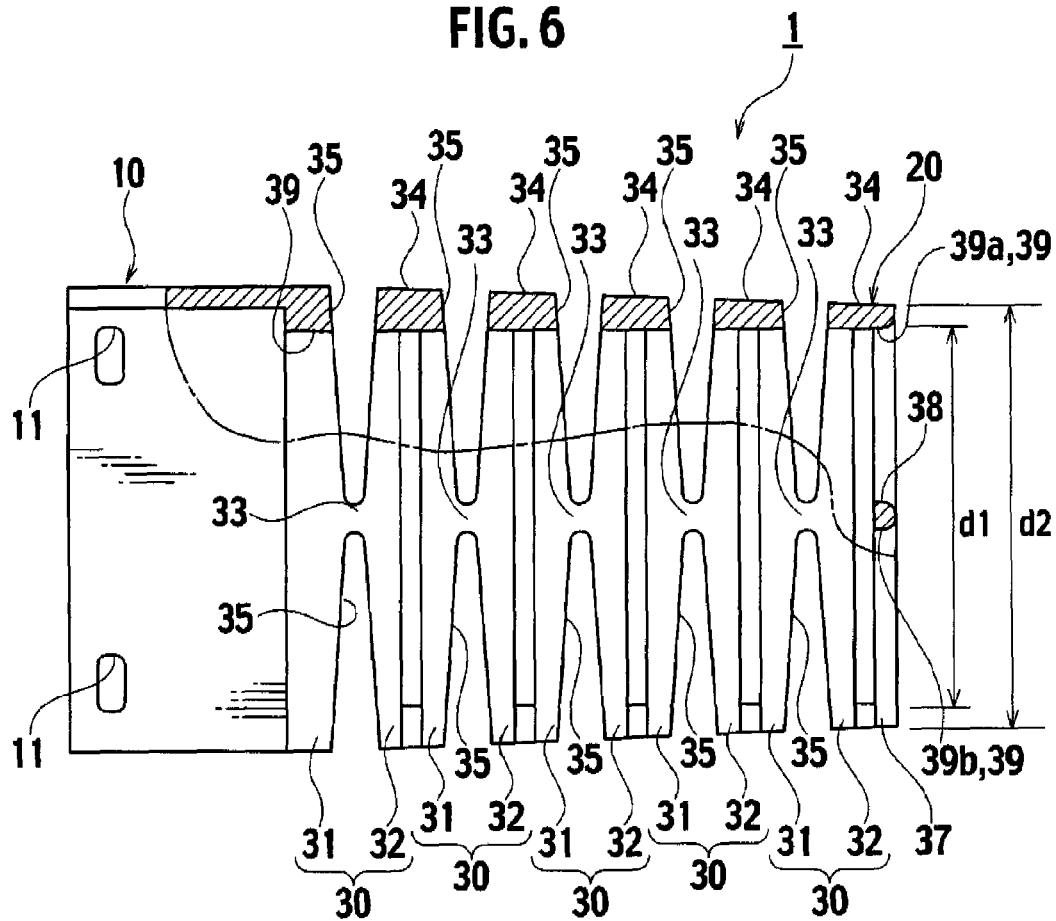
FIG. 6 is a front view showing a cross-section of a part of the optical connector boot according to the first exemplary embodiment of the present invention.
Figure 7:
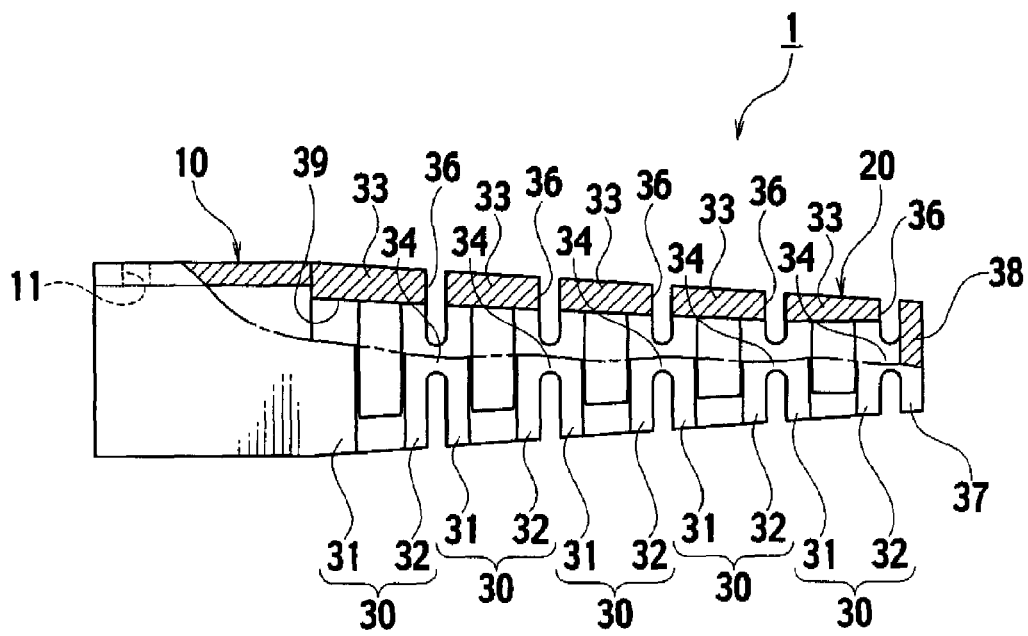
FIG. 7 is a bottom view showing a cross section of a part of the optical connector boot according to the first exemplary embodiment of the present invention.
Figure 8:
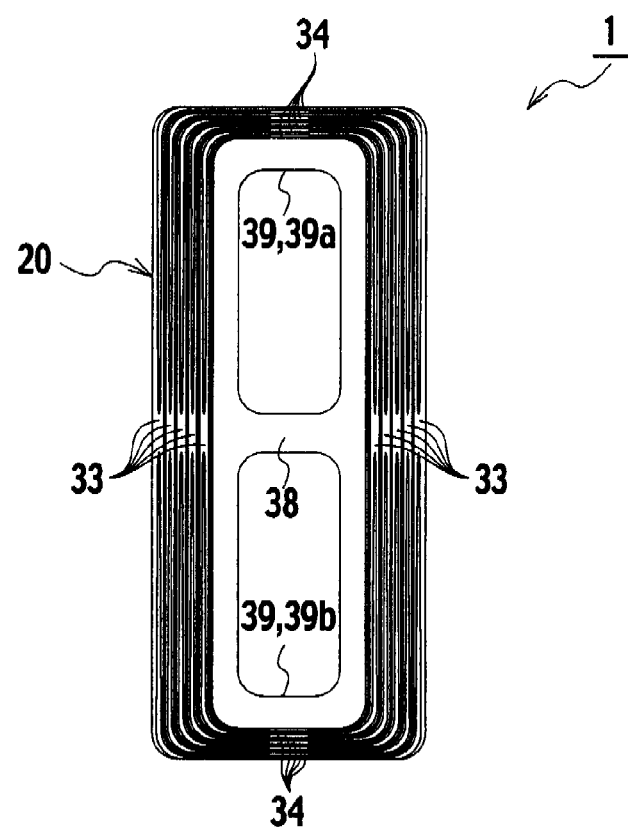
FIG. 8 is a right side view showing the optical connector boot according to the first exemplary embodiment of the present invention.
Figure 9:
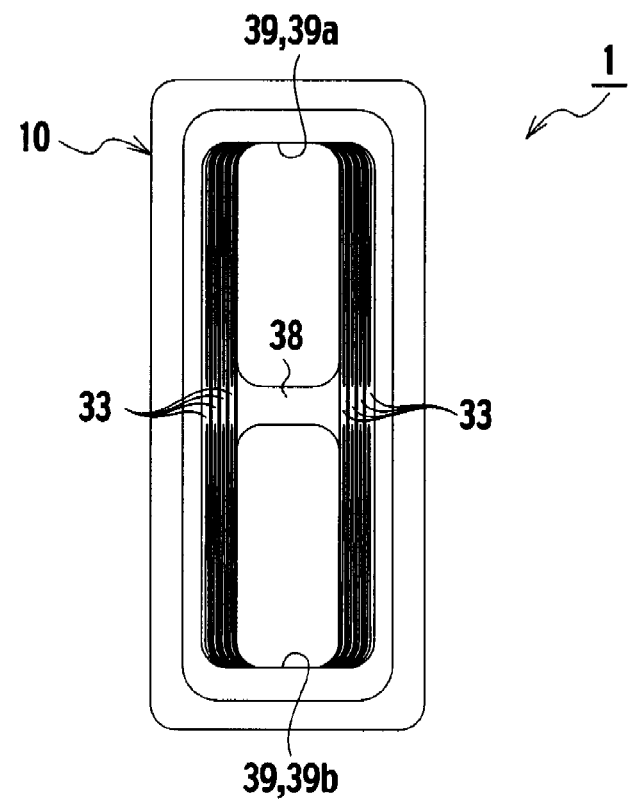
FIG. 9 is a left side view showing the optical connector boot according to the first exemplary embodiment of the present invention.
Figure 10A:
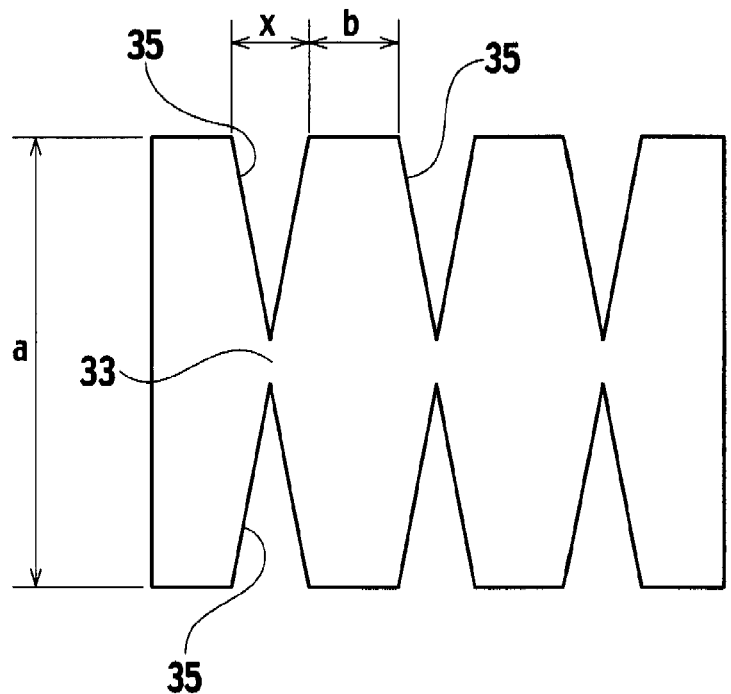
FIGS. 10A and 10B are schematic views showing a concept of the optical connector boot according to the first exemplary embodiment of the present invention.
Figure 10B:
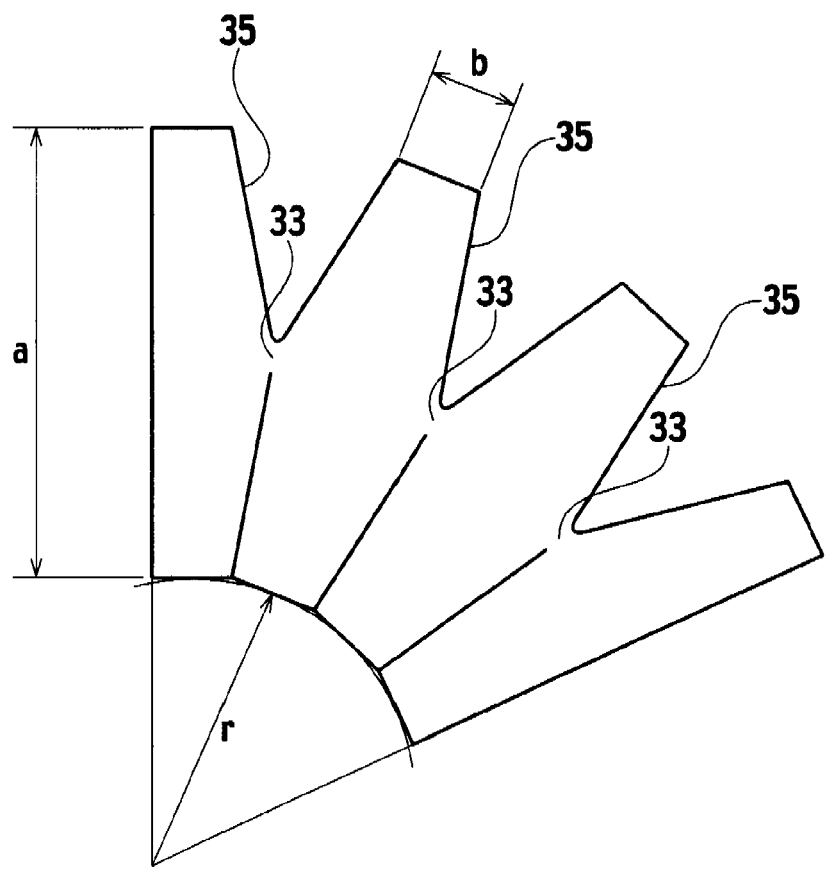
Figure 11:
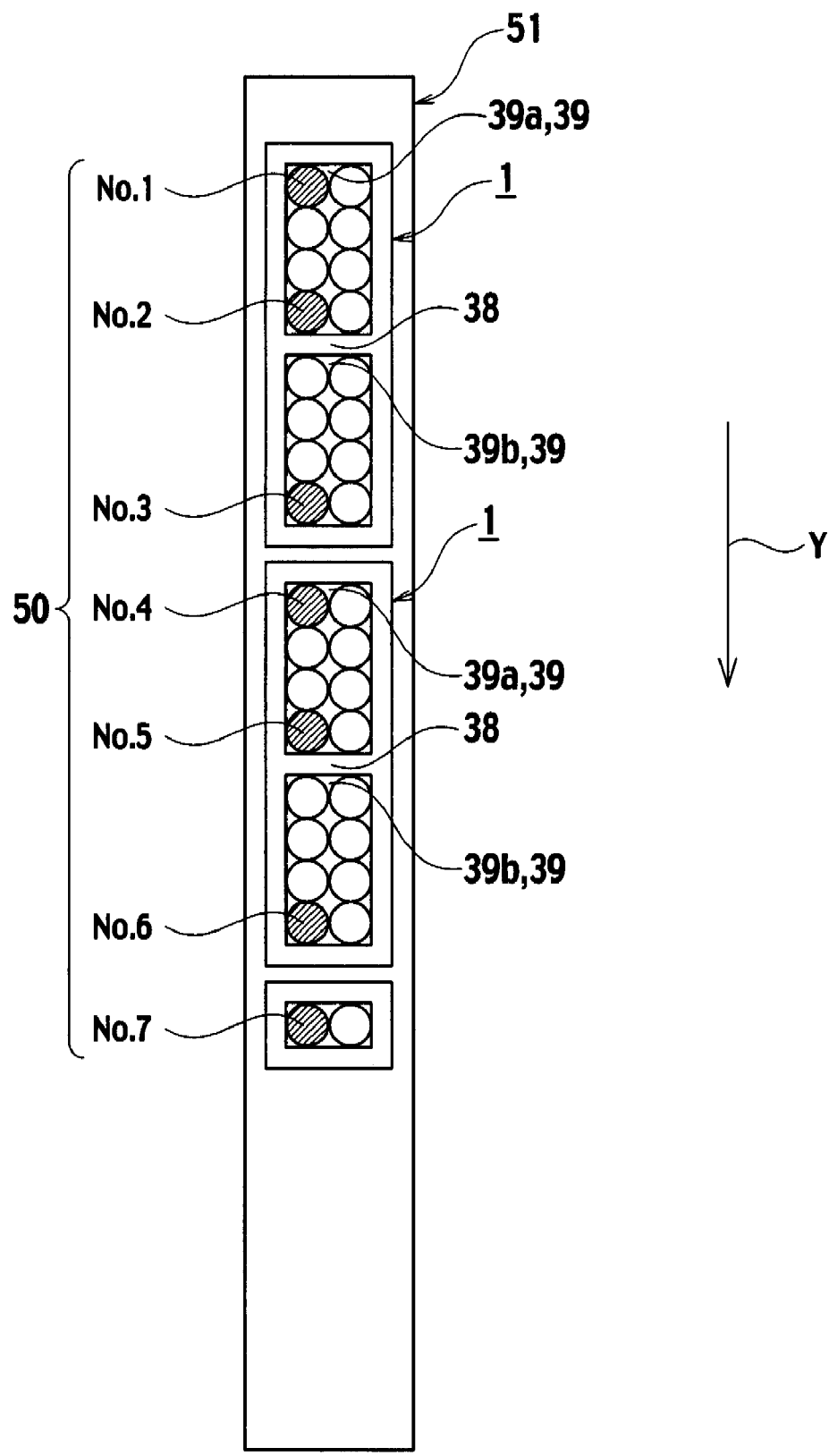
FIG. 11 is a cross-sectional view taken along a line XI-XI of FIG. 4, showing positions of optical fibers tested by an evaluation test employing the optical connector boot according to the first exemplary embodiment of the present invention.
Figure 12A:
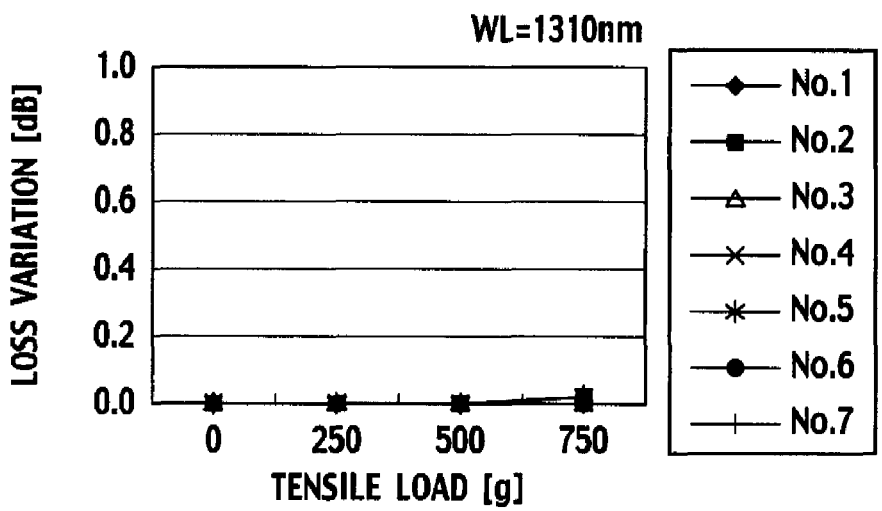
FIGS. 12A to 12C show measurement results of an evaluation test employing an optical connector boot showing an exemplary embodiment of the present invention, the evaluation test being related to a general-purpose optical fiber.
Figure 12B:
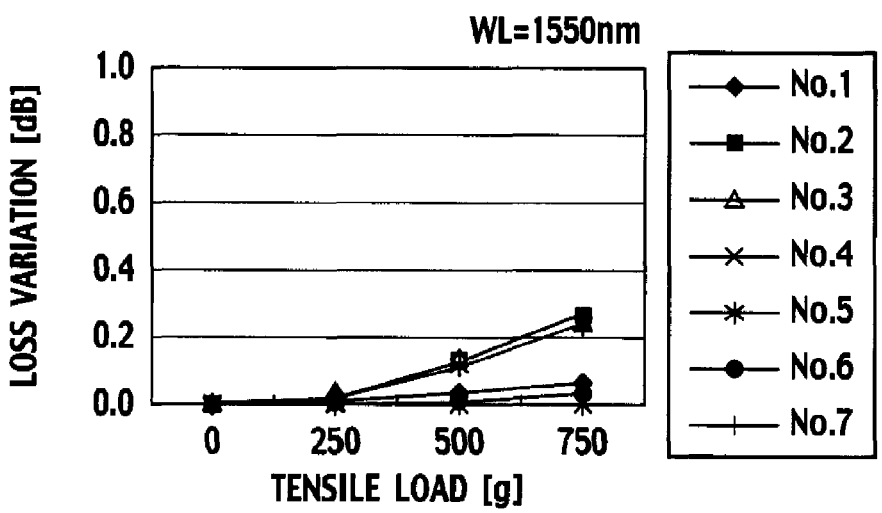
Figure 12C:
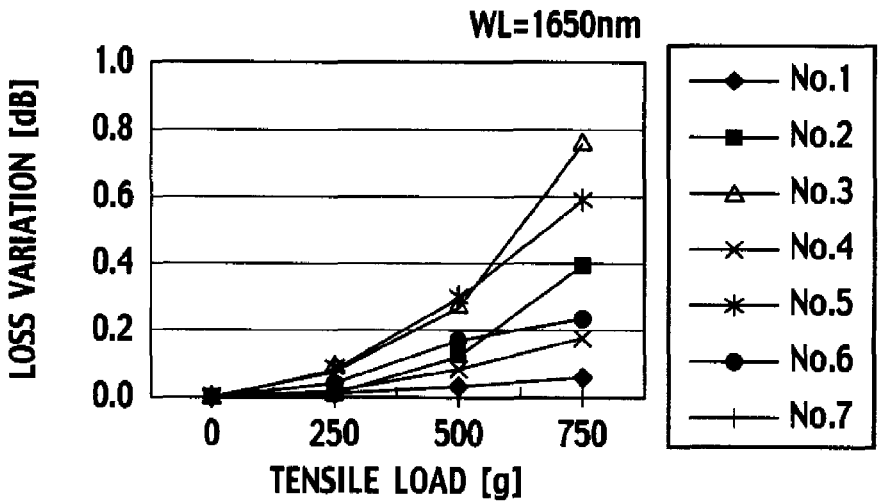
Figure 13A:
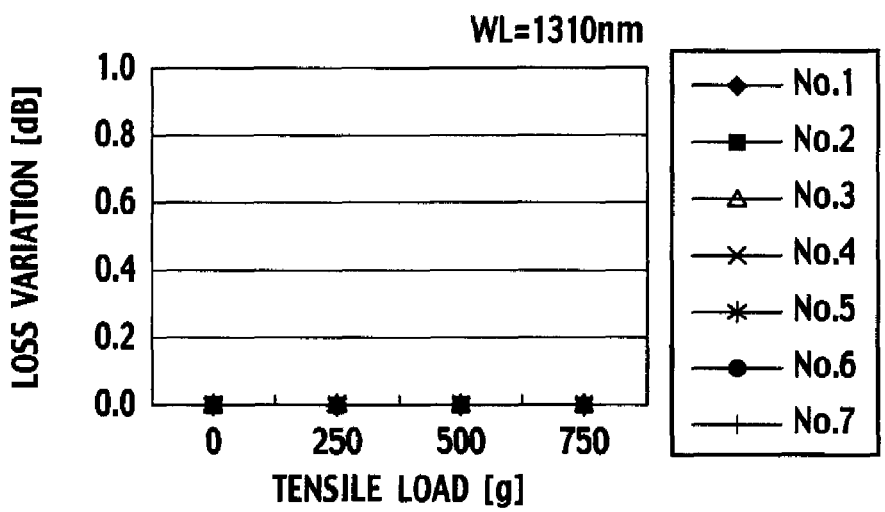
FIGS. 13A to 13C show measurement results of an evaluation test employing the optical connector boot according to the first exemplary embodiment of the present invention, the evaluation test being related to an optical fiber with a small bending loss.
Figure 13B:
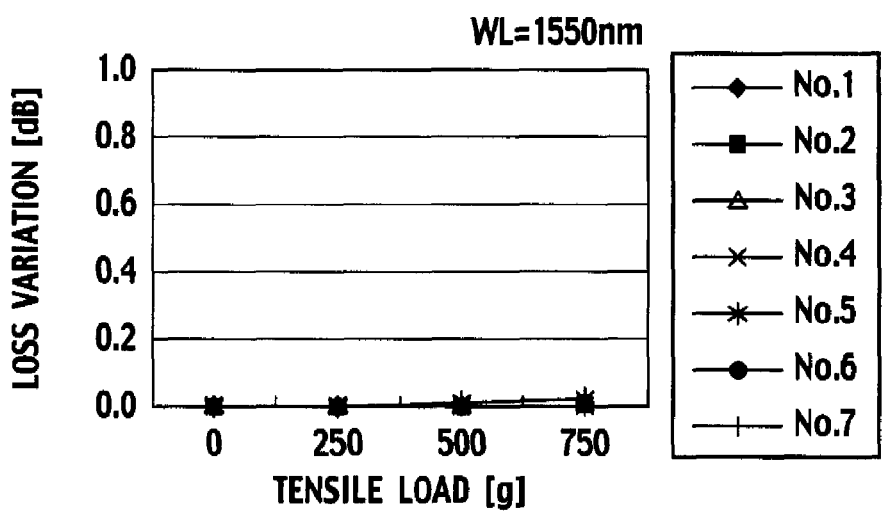
Figure 13C:
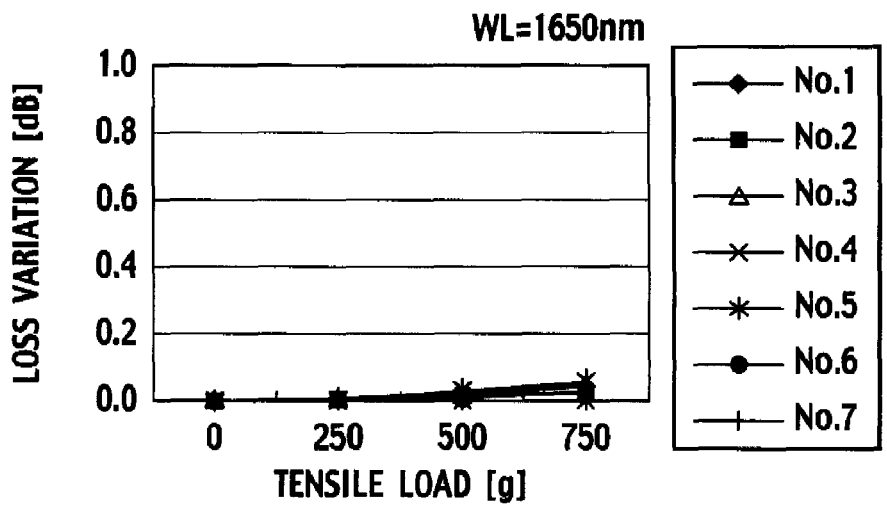

A description will be made below in detail of an optical connector boot according to an exemplary embodiment of the present invention based on the drawings. FIG. 4 to FIG. 11 show an exemplary embodiment of the present invention. FIG. 4 is a schematic configuration view showing a state where the optical connector boot is used. FIG. 5 is a perspective view of the optical connector boot. FIG. 6 is a front view showing a cross-section of a part of the optical connector boot. FIG. 7 is a bottom view showing the cross section of the part of the optical connector boot. FIG. 8 is a right side view of the optical connector boot. FIG. 9 is a left side view of the optical connector boot. FIGS. 10A and 10B are conceptual views showing a function of the optical connector boot: FIG. 10A is a view before a load is applied to the optical connector boot; and FIG. 10B is a view where the load is applied thereto. FIG. 11 is a cross-sectional view taken along a line A-A of FIG. 4, showing positions of optical fibers tested by an evaluation test using the optical connector boot. FIGS. 12A to 12C show measurement results of an evaluation test related to a general-purpose optical fiber: FIG. 12A shows measurement results when a wavelength of incident light is 1310 nm; FIG. 12B shows measurement results when the wavelength of the incident light is 1550 nm; and FIG. 12C shows measurement results when the wavelength of the incident light is 1650 nm. FIGS. 13A to 13C show measurement results of an evaluation test related to an optical fiber with a small bending loss: FIG. 13A shows measurement results when the wavelength of the incident light is 1310 nm; FIG. 13B shows measurement results when the wavelength of the incident light is 1550 nm; and FIG. 13C shows measurement results when the wavelength of the incident light is 1650 nm.

Each optical connector boot 1 is a cylindrical part for protecting optical fibers, in which the cylindrical part is integrally molded of soft resin. FIG. 4 shows a plurality of the optical connector boots 1 according to this embodiment. In the drawing, in a direction where optical connector plugs 50a such as SC connector plugs are attached onto tip ends of the optical fibers or optical cables, a rear-end side (upper side on the page showing FIG. 4) and a splitter case 51 side (lower side on the page showing FIG. 4) are defined.

The splitter case 51 houses therein optical parts such as a splitter and extra lengths of the optical fibers. The splitter case 51 is engaged with a panel of an optical instrument such as an optical distribution panel by both side portions 51a and 51b thereof. From a front surface 51b of the splitter case 51, a plurality of the optical fibers 50 are taken out through insides of the optical connector boots 1 and 1a attached onto the front surface 51b.

The plurality of optical fibers 50 are distributed to and housed in the multiplex fiber-use optical connector boots 1, each of which is capable of housing the plurality of optical fibers 50, and in the simplex fiber-use optical connector boot 1a capable of housing a single optical fiber 50. The inside of each of the multiplex fiber-use optical connector boots 1 is partitioned into two optical fiber insertion passages by a partition wall 38. In this embodiment, eight optical fibers 50 are housed in each of the optical fiber insertion passages. The eight optical fibers 50 are laterally arrayed in four columns (in a left-and-right direction on the page, that is, in a direction perpendicular to a direction of drawing the optical fibers 50 along the page), and are stacked in two layers (in a direction perpendicular to the page). Hence, one multiplex fiber-use optical connector boot 1 aligns and houses 16 simplex optical fibers 50. Reference numeral 52 denotes cable clamps, which are parts for aligning and fixing the optical fibers 50.

A description will be made of an exemplary structure of the optical connector boot 1 based on FIG. 5, FIG. 6 and FIG. 7. The optical connector boot 1 of this embodiment is composed of a rectangular fixing portion 10 and a flexible portion 20. As a whole, an exterior appearance of the optical connector boot 1 forms a rectangular and bellows shape, and forms a gradually tapered shape toward the optical connector plugs 50a side. In the respective drawings, side walls of the optical connector boot 1, which are opposite to each other, are symmetric with respect to each other, and form the same shape. Moreover, a width of each side wall 30a (in an upper-and-lower direction of the page in FIG. 6) is wider than a width of each side wall 30b (in an upper-and-lower direction of the page in FIG. 7). Hence, hereinafter, the side wall 30a is sometimes referred to as a wide side wall, and the side wall 30b is sometimes referred to as a narrow side wall.

The fixing portion 10 is composed of four side walls with a flat plate shape, and two engagement holes 11 and 11 are formed in upper and lower surfaces thereof (in a direction perpendicular to the page in FIG. 6). The fixing portion 10 is continuous with the frame body of the flexible portion 20 to be described later. The optical connector boot 1 is allowed to cover the cable clamp 52, and engagement protrusions (not shown) of the cable clamp 52, which are housed inside the fixing portion 10, are engaged with the two engagement holes 11, whereby the cable clamp 52 and the optical connector boot 1 are fixed to each other. Since the cable clamp 52 is fixed to the splitter case 51, the optical connector boot 1 and the splitter case 51 are fixed to each other.

A description will be made of the flexible portion 20. The flexible portion 20 is formed continuously with the fixing portion 10, and is an aggregate of a plurality of unit structures 30 gradually tapered toward the optical connector plugs 50a side. Each unit structure 30 forms a hollow rectangular-cylindrical shape in which first and second cover portions 31 and 32 forming the frame body are coupled to each other. Insides of the unit structures 30 form an insertion hole 39 through which the optical fibers 50 are inserted. The side walls of the unit structures 30 are coupled to one another by coupling portions 33 and 34 along an insertion direction (direction of the optical fibers 50 inserted into an inside of the optical connector boot 1) of the optical fibers 50.

A description will be made below more in detail of the flexible portion 20. The first portions 31 and second portions 32 of the unit structures 30 form the frame body surrounded by the wide side walls 30a and the narrow side walls 30b.

The wide side wall 30a of each first cover portion 31 and the wide side wall 30a of each second cover portion 32 opposite thereto in the same unit structure are coupled to each other by the first coupling portion 33. Positions where the above-described wide side walls 30a are coupled to each other are coupled regions 31a and 32a located on centers of the side walls in a width direction (the upper-and-lower direction of the page in FIG. 6) of the wide side walls 30a.

In the first cover portions 31 and the second cover portions 32, lateral widths thereof (in the left-right direction of the page in FIG. 6) are gradually increased toward the centers. Portions where the lateral widths of these first and second cover portions 31 and 32 become the maximum, that is, portions where the first and second cover portions 31 and 32 become the closest to each other become the coupled regions 31a and 32a. The first coupling portions 33 couple the coupled regions 31a and 32a to each other. In such a way, first slits 35 with a V shape are formed of the first cover portions 31, the second cover portions 32, and the first coupling portions 33.

The first slits 35 form opening portions which are symmetric on both sides (in the upper-and-lower direction of the page in FIG. 6) with respect to the first coupling portions 33 taken as the centers, are gradually open toward outer peripherals of the wide side walls 30a, and penetrate the inside and outside of the boot walls. The optical fibers 50 are exposed through the opening portions. In FIG. 7, the narrow side wall 30b of each first cover portion 31 and the narrow side wall 30b of another unit structure 30 adjacent thereto are coupled to each other by the second coupling portion 34. Positions where the above-described narrow side walls 30b are coupled to each other are coupled regions 31b and 32b located on centers in a width direction (the upper-and-lower direction of the page in FIG. 7) of the narrow side walls 30b. Each of the second coupling portions 34 couples the coupled region 31b and the coupled region 32b to each other. In the first cover portions 31 and the second cover portions 32, which compose the narrow side walls 30b, the lateral widths thereof (in a left-and-right direction of the page in FIG. 7) are constant. Second slits 36 with a U shape are formed of the first cover portions 31, the second cover portions 32, and the second coupling portions 34.

The second slits 36 form opening portions which are symmetric on both sides (in the upper-and-lower direction of the page space in FIG. 7) with respect to the second coupling portions 34 taken as the centers, and penetrate the inside and outside of the boot walls. The optical fibers 50 are exposed from the opening portions. In other words, the first coupling portions 33 are formed on either of the longitudinal or lateral side walls which form the rectangular cylinders of the optical connector boot 1, the second coupling portions 34 are formed on the other of the longitudinal and lateral side walls, and the first coupling portions 33 and the second coupling portions 34 are formed alternately.

On a rear end portion of the optical connector boot 1 on the optical connector plugs 50a side, a partition frame 37 coupled to the second cover portion 32 by the coupling portion 34 is disposed. An inside of the insertion hole 39 is partitioned into two holes, which are an insertion hole 39a and an insertion hole 39b, by a partition wall (coupling portion) 38 provided in the partition frame 37. Cross sections of these insertion holes 39a and 39b have the same shape. The partition wall (coupling portion) 38 is a member that couples the opposite wide side walls 30a and 30a to each other at centers of the wide side walls 30a in the width direction. The partition wall 38 is located on a line where the first coupling portions 33 are extended along a longitudinal direction of the optical connector boot 1. Specifically, the partition wall 38 is located on a center of the optical connector boot 1. With regard to a position of the partition wall 38, the partition wall 38 may be provided only in the partition frame 37 located on the rear end of the optical connector boot 1, or alternatively, the partition walls 38 may be provided immediately under a plurality or all of the coupling portions. By increasing the number of partition walls 38, a passage through which the optical fibers 50 are inserted is clearly defined, thus making it possible to stabilize stack arrangement of the optical fibers 50.

FIG. 8 is a right side view of the optical connector boot 1 when viewed from the rear-end side, and FIG. 9 is a left side view of the optical connector boot 1 when viewed from a tip-end.

In order to taper an outer diameter of the optical connector boot 1 toward the optical connector plugs 50a side, the widths of the wide side walls 30a and the narrow side walls 30b become gradually thinner from the splitter case 51 toward the optical connector plugs 50a side. The optical connector boot 1 of this embodiment is formed so that a thickness of the narrow side walls 30b can become gradually thinner whereas a thickness of the wide side walls 30a is constant. Hence, inner diameters of the insertion holes 39, 39a and 39b become narrower in a left-and-right direction on a page space though are constant in an upper-and-lower direction thereon. However, how the inner diameters of the insertion holes 39, 39a and 39b are changed and how the thicknesses of the side walls are changed are not limited to those of this embodiment.

Sixteen optical fibers 50 are inserted into the optical connector boot 1 in which each of the sixteen fibers 50 has a coated core with a diameter of 2 mm. In a case where the optical connector boot 1 is bent. In order to suppress variations of an optical loss in each optical fiber 50 at a predetermined value or less (1.0 dB or less in the case of a conventional optical fiber (SM fiber), and 0.1 dB or less in the case of an optical fiber (Future Guide®-SR15) with a small bending loss), a radius of a virtual circle at a position where a radius of curvature of the optical connector boot 1 becomes the smallest in a state of bending the optical connector boot 1 just needs to be set at 15 mm or more. This fact is obtained by a calculation. Accordingly, with regard to the respective portions of the optical connector boot 1, dimensions thereof are set as follows. Specifically, as shown in FIGS. 10A and 10B, a dimension in the upper-and-lower direction of the optical connector boot 1 is defined as a, a dimension in the longitudinal direction of the first and second cover portions 31 and 32 coupled to each other by each second coupling portion 34 is defined as b, a slit width of each first slit 35 is defined as x, an overall length of the optical connector boot 1 is defined as L, and the radius of the virtual circle at the position where the radius of curvature of the optical connector boot 1 becomes the smallest in the state of bending the optical connector boot 1 is defined as r. In this case, when the dimension a is equal to 26 mm, the dimension b is equal to 3.3 mm, the slit width x is equal to 2.8 mm, and the overall length L is equal to 48.8 mm, the radius r of the virtual circle becomes equal to 15.3 mm in the state of bending the optical connector boot 1.

Evaluation Test

Evaluation samples of the optical connector boot 1 were fabricated in accordance with the above-described dimensions, and evaluation tests were implemented therefor. Note that each of the evaluation samples was integrally formed of polyester elastomer (Hytrel made by Dupont-Toray Co., Ltd.). During the evaluation tests, a tensile load was applied to the evaluation samples downward (in a Y direction in FIG. 11) in a vertical direction. A magnitude of the tensile load was set at 250g, 500g, and 750g. A wavelength of light to be measured was set at 1310 nm, 1550 nm, and 1650 nm. In the above-described test patterns, the variations of the optical losses were measured for the above-described general-purpose optical fibers and optical fibers with a small bending loss. FIGS. 12A to 12C show measurement results of the variations of the optical loss of the general purpose optical fibers, and FIGS. 13A to 13C show measurement results of the variations of the optical loss of the optical fibers with a small bending loss. The respective measurement results correspond to the respective positions of the optical fibers 50, which are shown in FIG. 11.

From the results of the evaluation tests, which are shown in FIGS. 12A to 12C and FIGS. 13A to 13C, it was verified that, in accordance with a configuration of the optical connector boot 1 according to embodiments of the present invention, it was possible to reduce the variations of the optical loss in each optical fiber 50 to the predetermined value or less, as calculated. This results from that, in the optical connector boot 1 according to embodiments of the present invention, the first coupling portions 33 become the narrowest portions sandwiched by the first slits 35. Specifically, the first coupling portions 33 are bent at positions of the above-described narrowest portions without being positionally shifted in a shearing direction even if a pulling load is applied. Accordingly, the optical connector boot 1 forms the virtual circle as designed, and the variations of the optical losses were reduced to the predetermined value or less.

Figure 1:
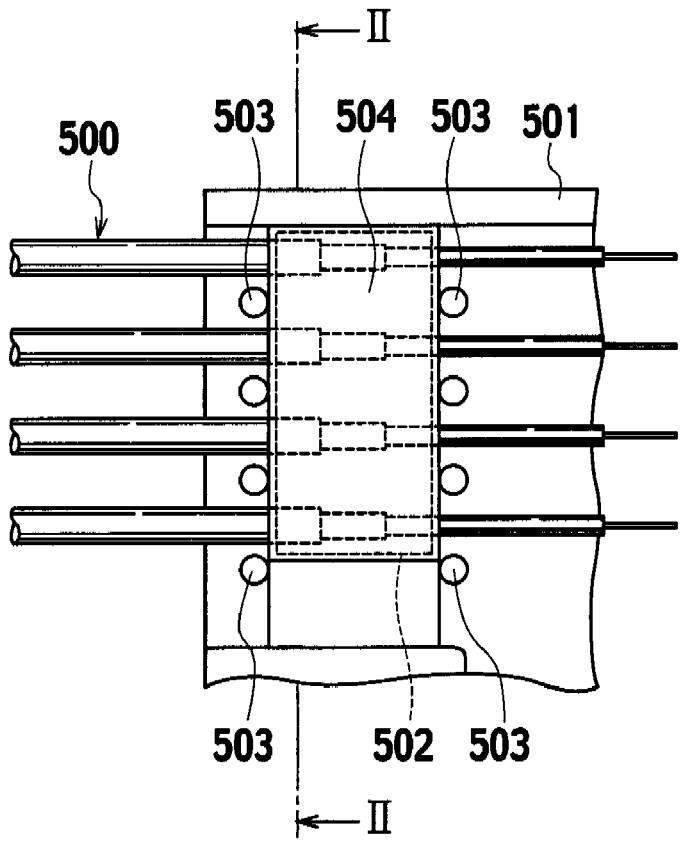
FIG. 1 is a plan view showing a related cable fixing structure.
Figure 2:
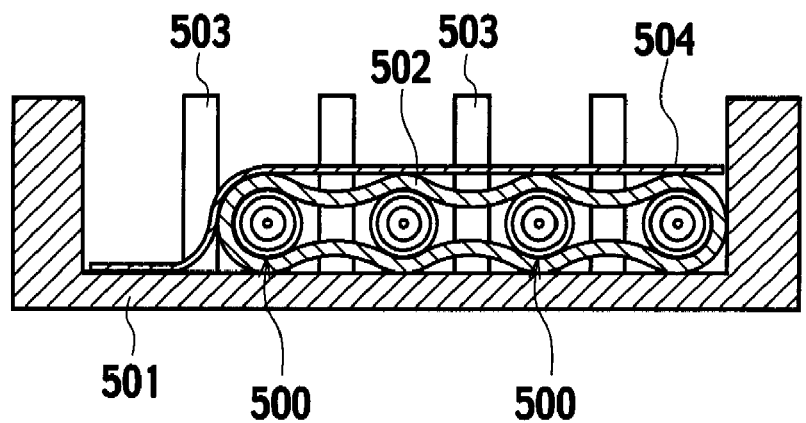
FIG. 2 is a cross-sectional view taken along a line II-II of FIG. 1.
Figure 3A:
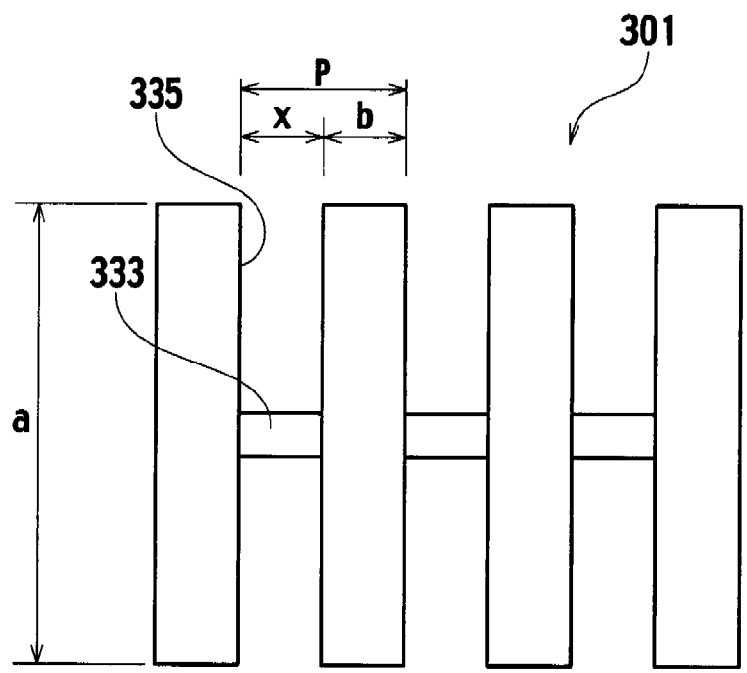
FIGS. 3A and 3B are schematic views showing a concept of a related optical connector boot.
Figure 3B:
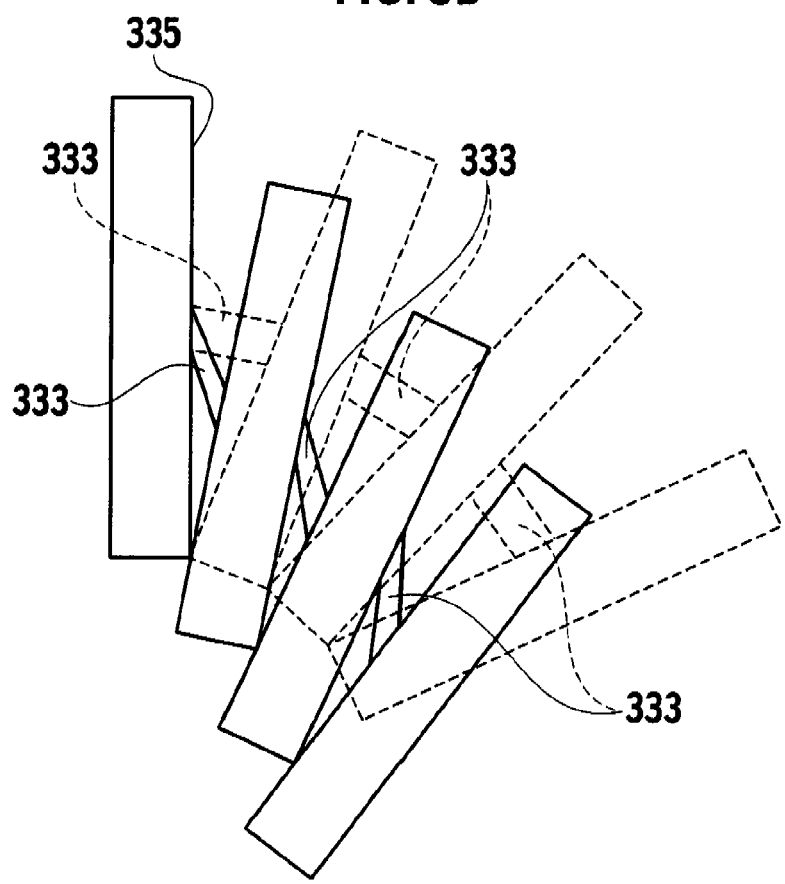

However, in the related optical connector boot 301 shown in FIG. 3, the variations of the optical losses cannot be reduced even if the respective dimensions (a, b, x, L) thereof are made to coincide with those of the optical connector boot 1. This results from that, since the shape of the slits 335 is not a so-called V-groove shape but a shape with a constant width, the coupling portions 333 have a beam shape with a length of x. Specifically, by the fact that the coupling portions 333 have the beam shape, the coupling portions 333 are bent in the shearing direction (refer to solid lines of FIG. 3B) when a pulling load is applied, and some spots are bent at a smaller radius of curvature than that of the designed virtual circle, which increases the variation in the optical losses.

Since the first slits 35 have the so-called V-groove shape gradually expanded outward while the first slits 35 are sandwiching the first coupling portions 33 therebetween, the optical connector boot 1 of this embodiment is bent at the first coupling portions 33, and as a whole, the optical connector boot 1 is curved in a circular arc shape while forming the predetermined virtual circle. Accordingly, the optical fibers are bent gently without being positionally shifted in the shearing direction, thus making it possible to reduce optical transmission losses thereof.

Moreover, the opening portions of the first slits 35 are large, and it becomes easy to bend the optical connector boot 1. Accordingly, it becomes easy to handle the optical connector boot 1, and a bending force greater than assumed is not applied to the optical fibers 50.

In the optical connector boot 1, the outer diameter thereof is gradually reduced from the tip-end toward the rear-end while the inner diameter thereof is being kept constant, whereby, toward the rear-end side, the optical connector boot 1 is gradually thinned, becomes more likely to be bent, and is bent along the curving of the optical fibers 50. Accordingly, side thrust applied to the optical fibers 50 at the rear end portion of the optical connector boot 1 can be reduced.

The partition wall 38 that partitions the insertion hole 39 in the upper-and-lower direction is provided, whereby the number of stages of the optical fibers 50 stacked in the upper-and-lower direction is reduced, and side thrust applied to the lowermost stage is reduced. In this application, stages refer to rows or layers of optical fibers. Note that, when a partition wall (not shown) is formed that partitions the insertion hole 39 in the width direction, the arrangement of the upper optical fibers is not broken, and accordingly, the side thrust owing to the breakage of the arrangement can be prevented from occurring.

The first slits 35 and the second slits 36 are provided, whereby the optical connector boot 1 becomes likely to be curved, and the side thrust applied to the optical fibers 50 can be reduced.

The first coupling portions 33 and the second coupling portions 34 are alternately arranged at an interval of 90 degrees in the circumferential direction, whereby the optical connector boot 1 becomes likely to be curved, and the side thrust applied to the optical fibers 50 can be reduced.

The optical connector boot 1 is formed into a rectangular-cylindrical shape, and thus is likely to be bent in a specific direction, and less likely to be bent in an unexpected direction. Accordingly, the optical fibers 50 which are likely to be affected by the side thrust in the insertion hole 39 can be specified, and it becomes easy to take countermeasures thereagainst.

In the arrangement of the optical fibers 50 housed in the multiplex fiber-use optical connector boot 1 formed into the rectangular shape, when the number of optical fibers 50 differs between the longitudinal and lateral directions, the optical connector boot 1 is more likely to bend in one direction than in another. For example, in the optical connector boot 1 of the present embodiment, eight optical fibers 50 are arrayed in a direction between the narrow side walls 30b and 30b, and two optical fibers 50 are arrayed in a direction between the wide side walls 30a and 30a. Hence, the optical connector boot 1 is less likely to bend in the direction in which the wide side walls 30a extend, and is likely to bend in the direction in which the narrow side walls 30b extend, which is perpendicular to the direction in which the wide side walls 30a extend.

In exemplary embodiments of the present invention, the first slits 35 are formed on the wide side walls 30a, which enhances the degree of freedom of the optical connector boot 1 in bending in the direction in which the wide side walls 30a extend (the direction in which it is less likely to bend). Moreover, the first slits 35 open widely, which reduces the area of the side walls that restrains the optical fibers 50. Accordingly, a degree of freedom in bending of the optical fibers 50 is enhanced in addition to that of the optical connector boot 1, and thus a bending stress can be prevented from occurring locally. Moreover, the inside of the optical connector boot 1 is partitioned, thus making it possible to stabilize the stacked state of the optical fibers 50.

In the present embodiment, the second slits 36 formed on the narrow side walls 30b are likely to be bent in the direction along the narrow side walls 30b, and accordingly, are formed not into an expanded shape but into the U shape; however, they are not limited to this and may be formed into the expanded shape. The optical connector boot 1 is bent in a predetermined direction in the case of being attached onto an optical instrument in which the optical fibers 50 are extended out of a fixed frame, the optical instrument including the splitter case 51, the optical distribution panel (not shown), an optical distribution frame (not shown), a cabinet (not shown), an optical distribution box (not shown), and the like. For example, the optical connector boot 1 may just hang downward in the vertical direction owing to the weight of the optical fibers 50. When this direction is defined as a main bending direction, such a bending load applied to the optical fibers 50 in the direction (wall direction) along the wide side walls 30a of the optical connector boot 1 can be relieved. However, the direction where the optical fibers 50 are bent is not limited to the vertical direction depending on cabling of the optical fibers 50, and accordingly, an attaching direction of the wide side walls 30a becomes along a direction (main direction) where a bending angle of the optical fibers 50 is supposed to be the largest.

In accordance with the optical connector boot of exemplary embodiments of the present invention, the opening portions made of the slits making pairs have symmetric shapes that gradually expand toward the outsides of the side walls while sandwiching the first coupling portions between the pair of slits. Accordingly, the optical connector boot is bent so that the bending centers of the plurality of optical fibers inserted into the insertion holes can coincide with the center portions of the first coupling portions, and as a whole, the optical connector boot can be curved with a predetermined bending radius or less. In such a way, local and excessive force transfer is prevented for the optical fibers, and accordingly, the bending of the optical fibers can be moderated. As a result, the optical transmission losses can be reduced.

Moreover, the expanded slits are formed on the wide side walls, whereby the bending force applied to the optical fibers is dispersed by the opening portions of the slits even if the optical connector boot is bent in the direction along the wall direction of the wide side walls, thus making it possible to reduce the optical transmission losses.

The slits have the V shape, which can enhance the ease of bending the optical connector boot and dispersion of the bending force due to the opening portions of the slits. Besides the above, the maximum bending amount of the optical connector boot is regulated by the sides of the V grooves. Therefore, the excessive bending of the optical connector boot can be prevented.

Furthermore, the partition frame having the partition wall is provided on the rear end portion of the optical connector boot, and partitions the insertion hole, thus making it possible to prevent disturbance of the arrangement of the optical fibers from occurring in the insertion holes even if the number of optical fibers to be housed in the optical connector boot is increased.

The plurality of partition walls are formed along the extended direction of the first coupling portion, whereby the route through which the optical fibers are inserted is clearly defined, and the stack arrangement state of the optical fibers can be stabilized.

When the case is attached onto the optical instrument, the direction in which the wall surfaces of the wide side walls extend and on which the expanded slits are formed is matched with the main direction where the optical fibers extended from the case are bent. that is, the direction in which the wide side walls extend is matched with the main direction where the optical connector boot is bent, thus making it possible to moderate the bending of the plurality of optical fibers inserted into the boot. Thus, for the plurality of optical fibers housed in the boot, the local bending and the disturbance of the distribution therein can be prevented from occurring. Accordingly, even if a large number of the optical connector boots are placed in the optical instrument, the optical transmission losses can be prevented.

Second Exemplary Embodiment

A description will be made of an exemplary embodiment of the present invention based on the drawings.

Figure 14:
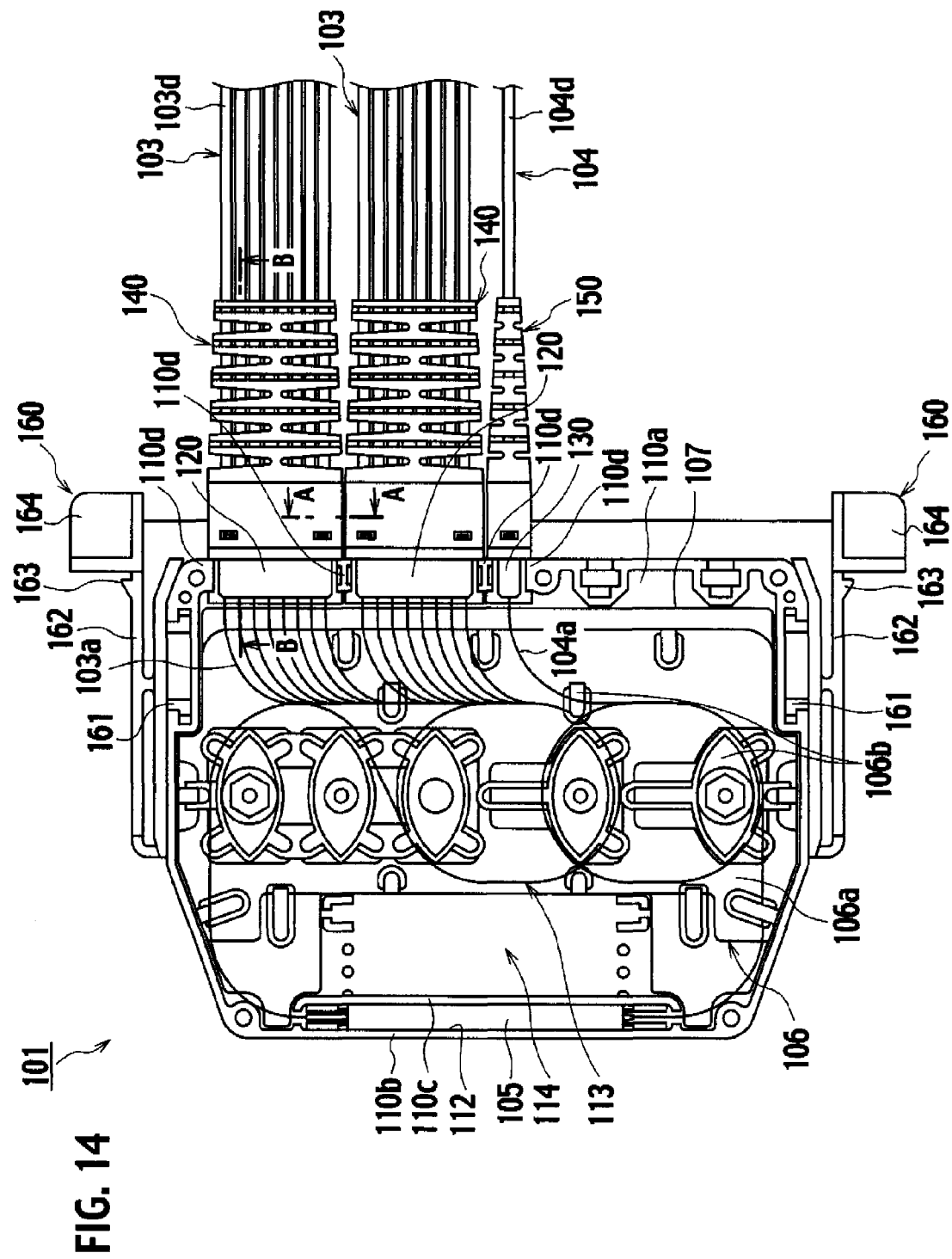
FIG. 14 is a plan view of an optical branching module according to a second exemplary embodiment of the present invention, from which a cover is detached.
Figure 15A:
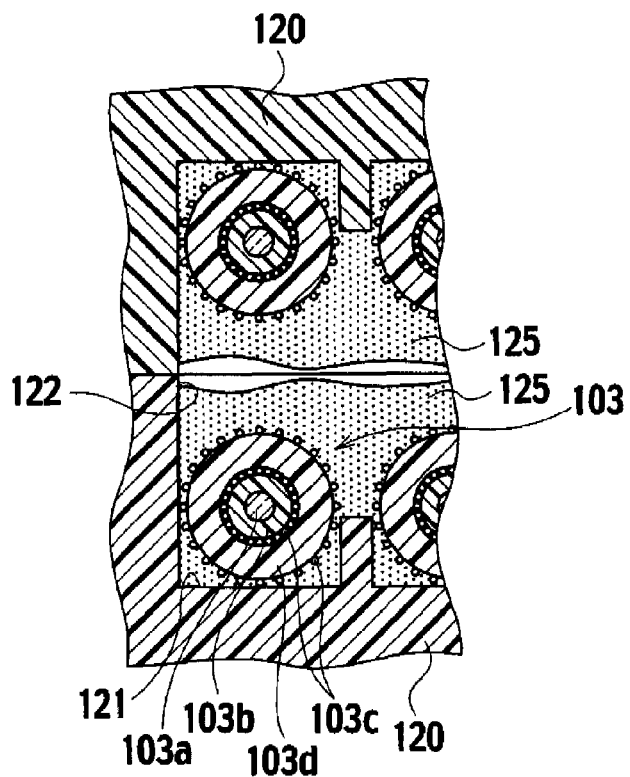
FIG. 15A is a enlarged cross-sectional view taken along a line A-A of FIG. 14.
Figure 15B:
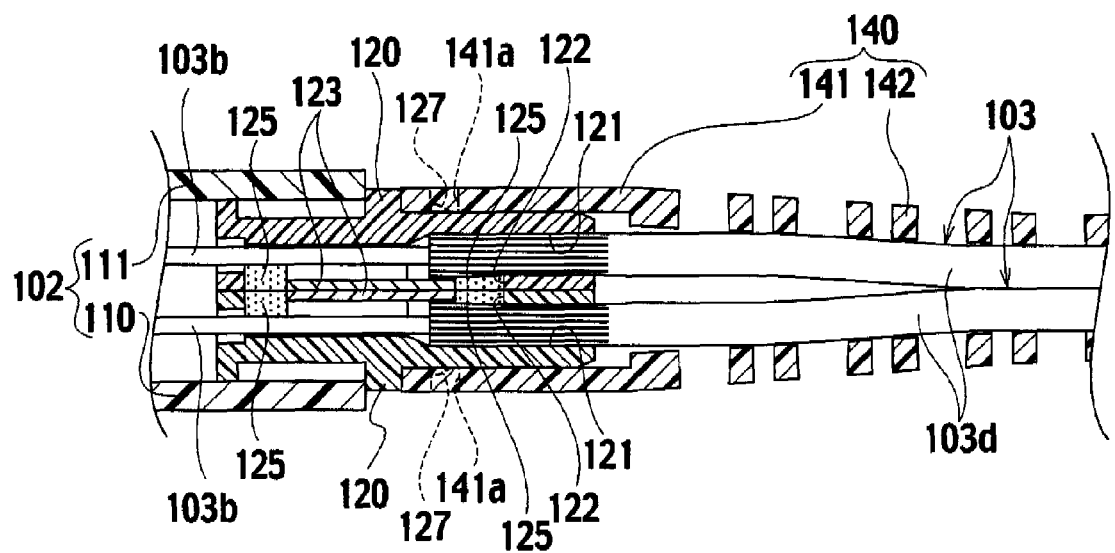
FIG. 15B is a enlarged cross-sectional view taken along a line B-B of FIG. 14.
Figure 16:
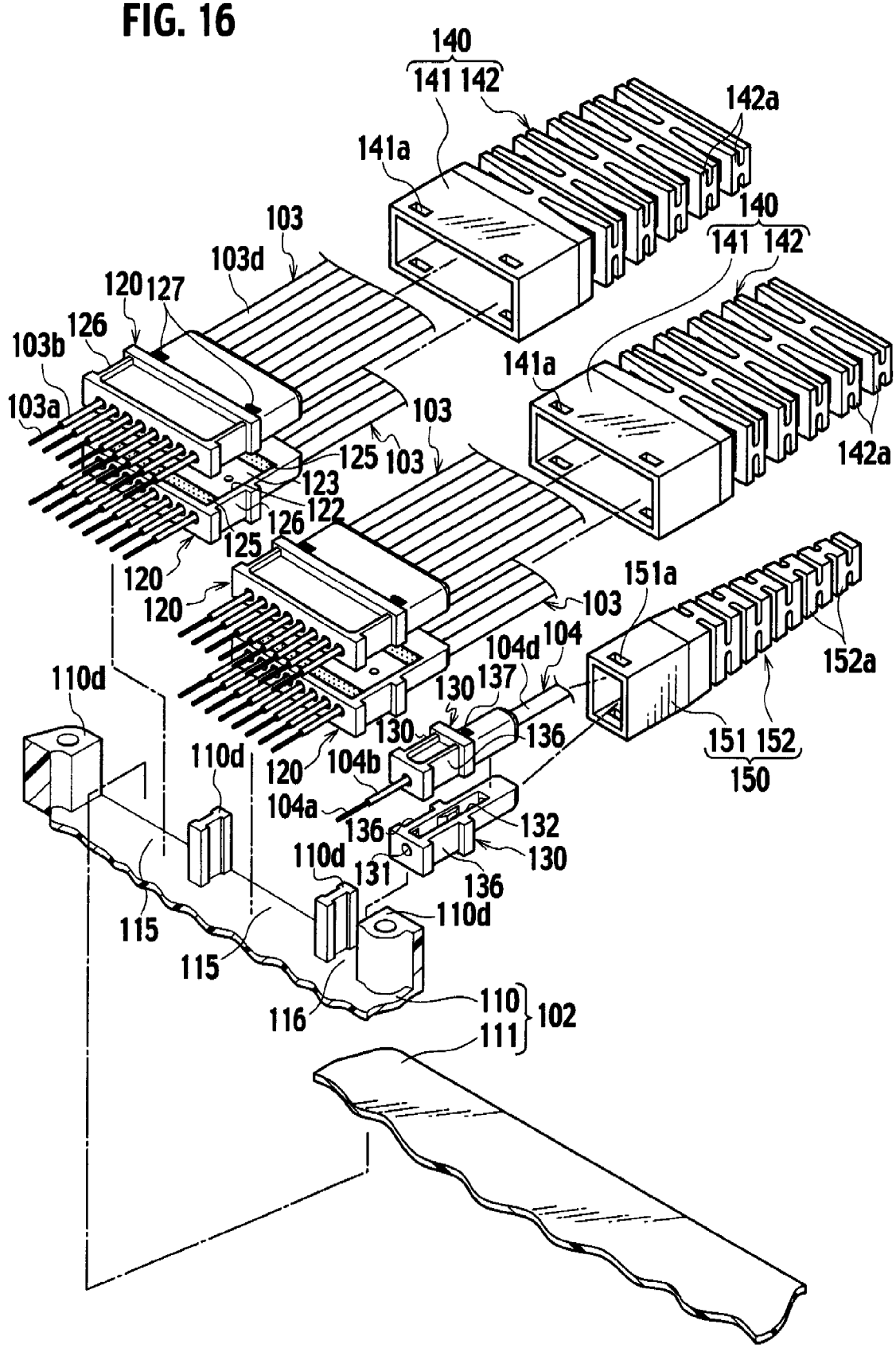
FIG. 16 is an exploded perspective view of the optical branching module according to the second exemplary embodiment of the present invention.
Figure 17:
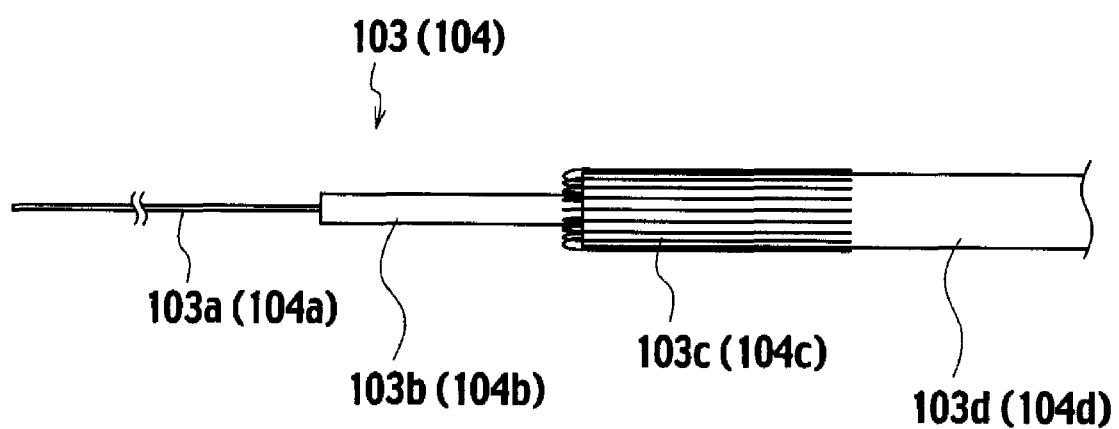
FIG. 17 is a front view of one end of a cable according to the second exemplary embodiment of the present invention.
Figure 18:
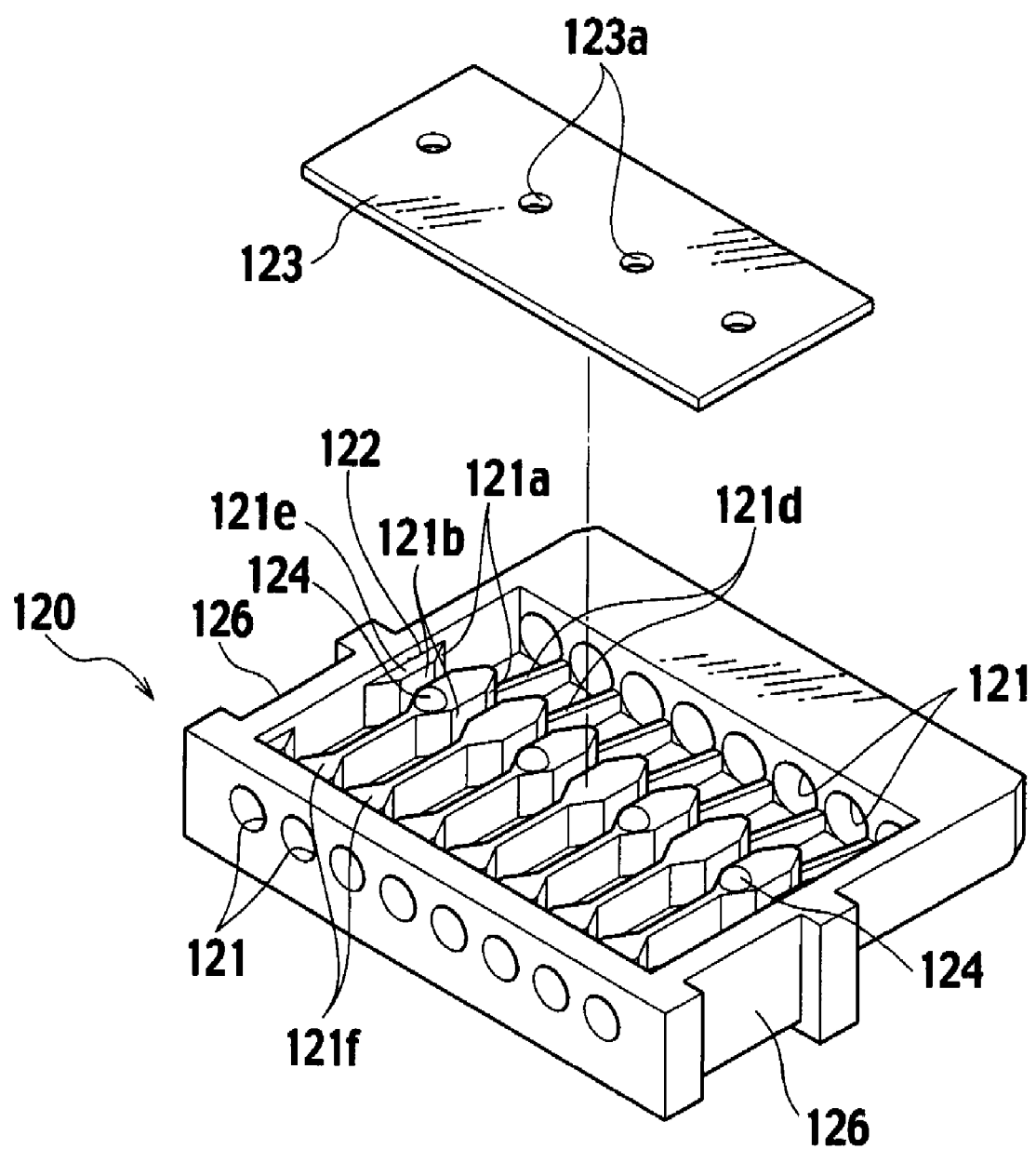
FIG. 18 is a perspective view of an output-cable fixing member and a cable support plate according to the second exemplary embodiment of the present invention.
Figure 19:
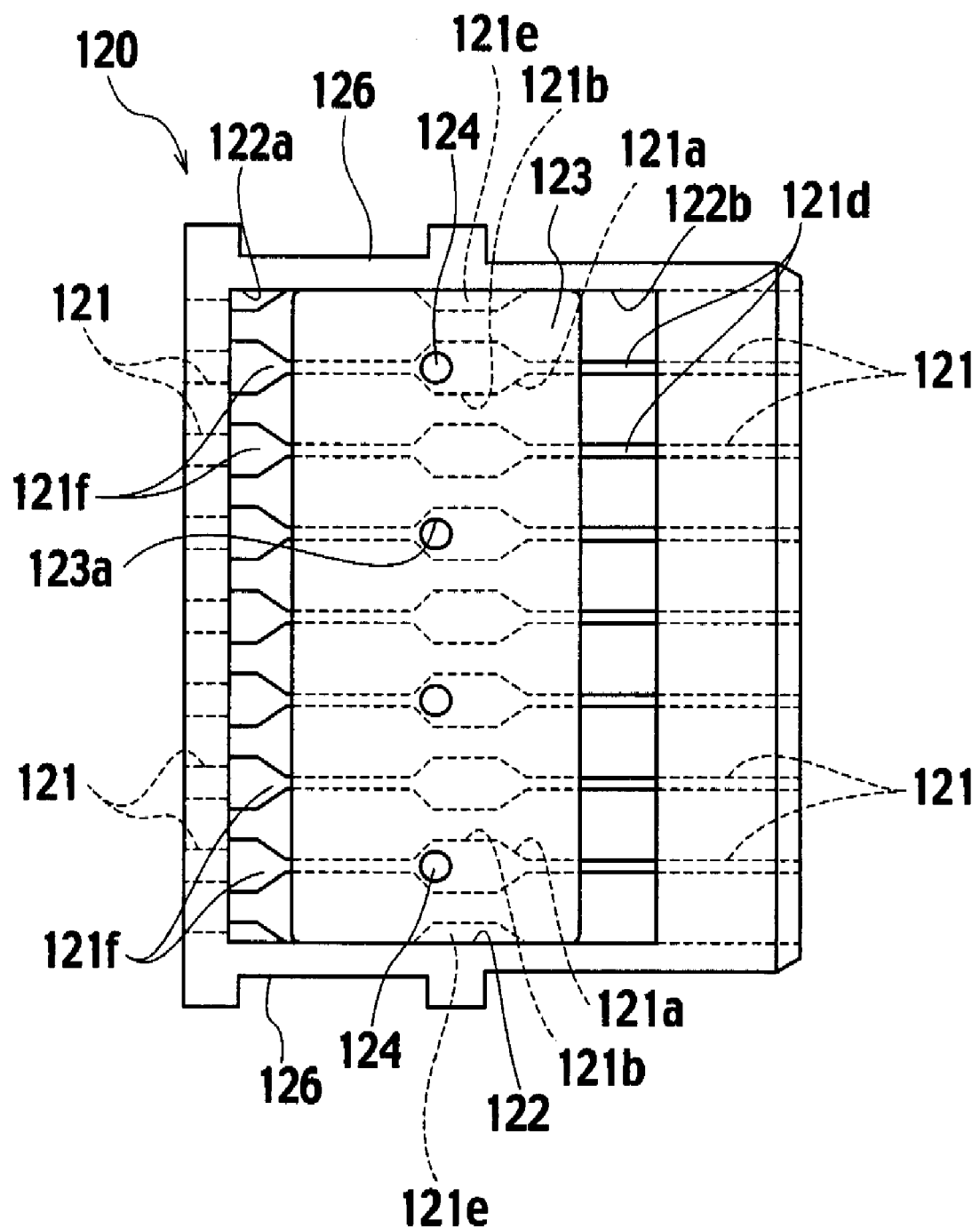
FIG. 19 is a plan view of the output-cable fixing member according to the second exemplary embodiment of the present invention, onto which the cable support plate is attached.
Figure 20:
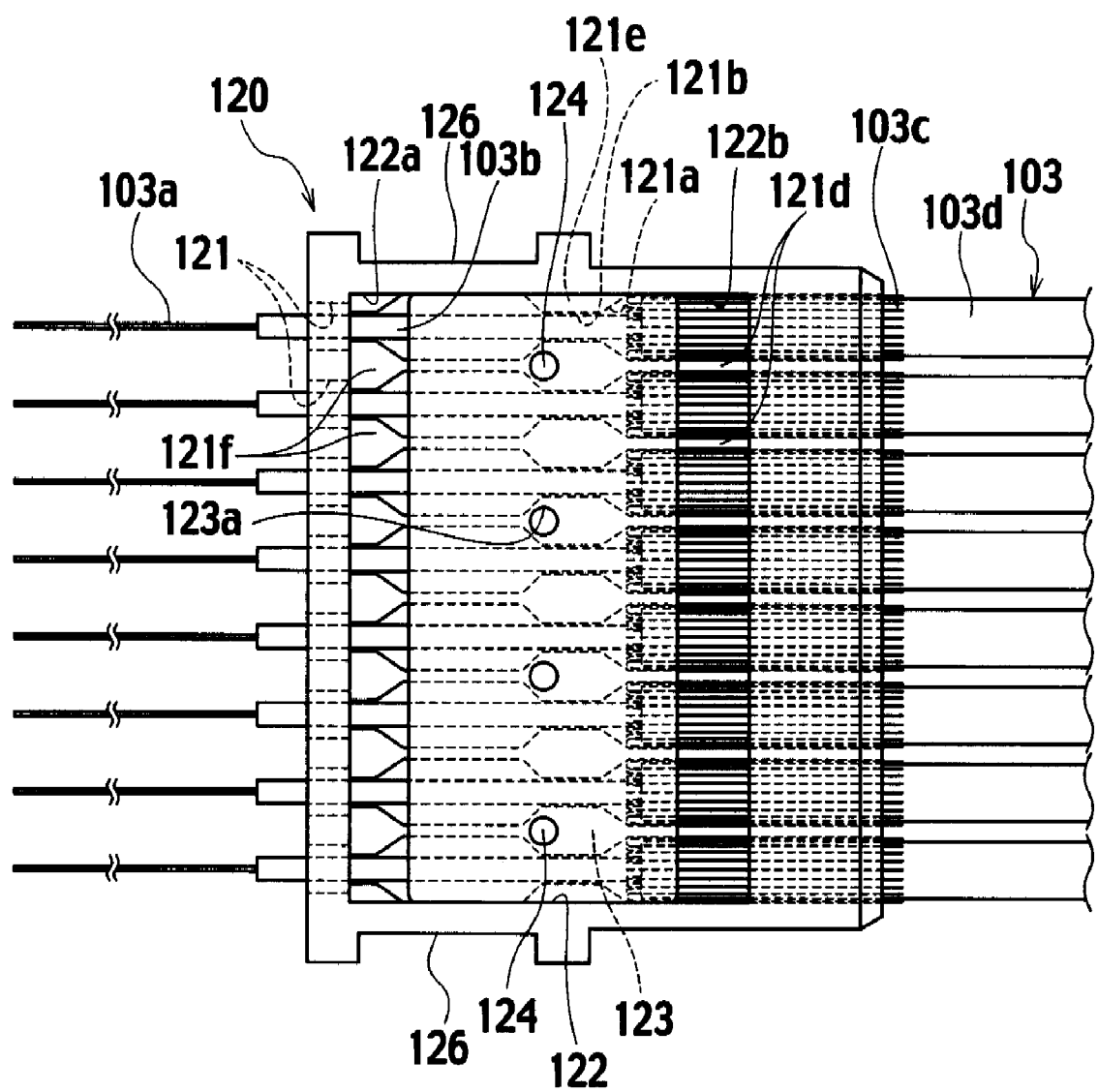
FIG. 20 is a plan view of the output-cable fixing member according to the second exemplary embodiment of the present invention, in which cables on an output side are inserted into cable insertion holes.
Figure 21:
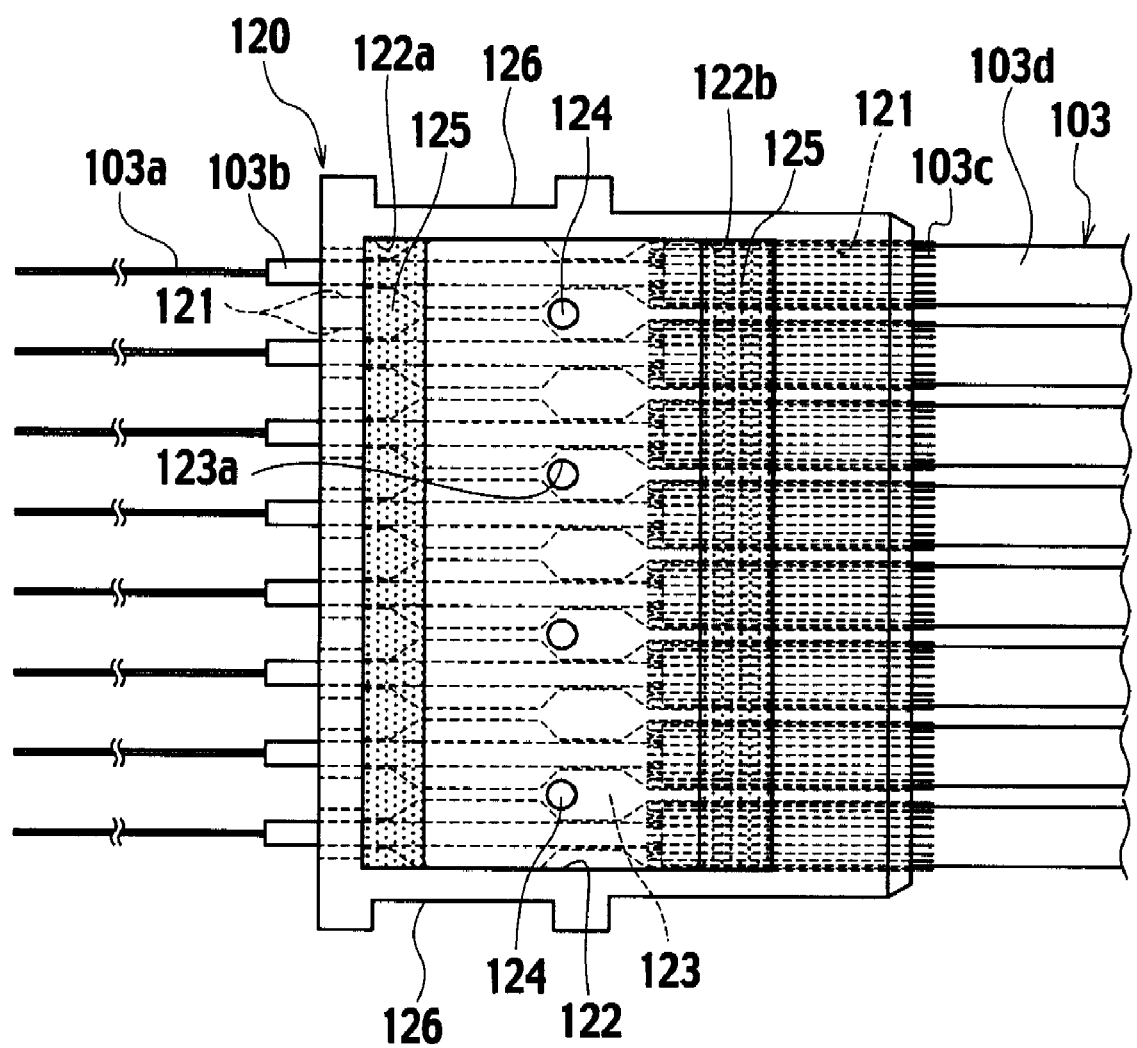
FIG. 21 is a plan view of the output-cable fixing member according to the second exemplary embodiment of the present invention, in which an adhesive is coated on adhesive coating regions of an opening portion.
Figure 22:
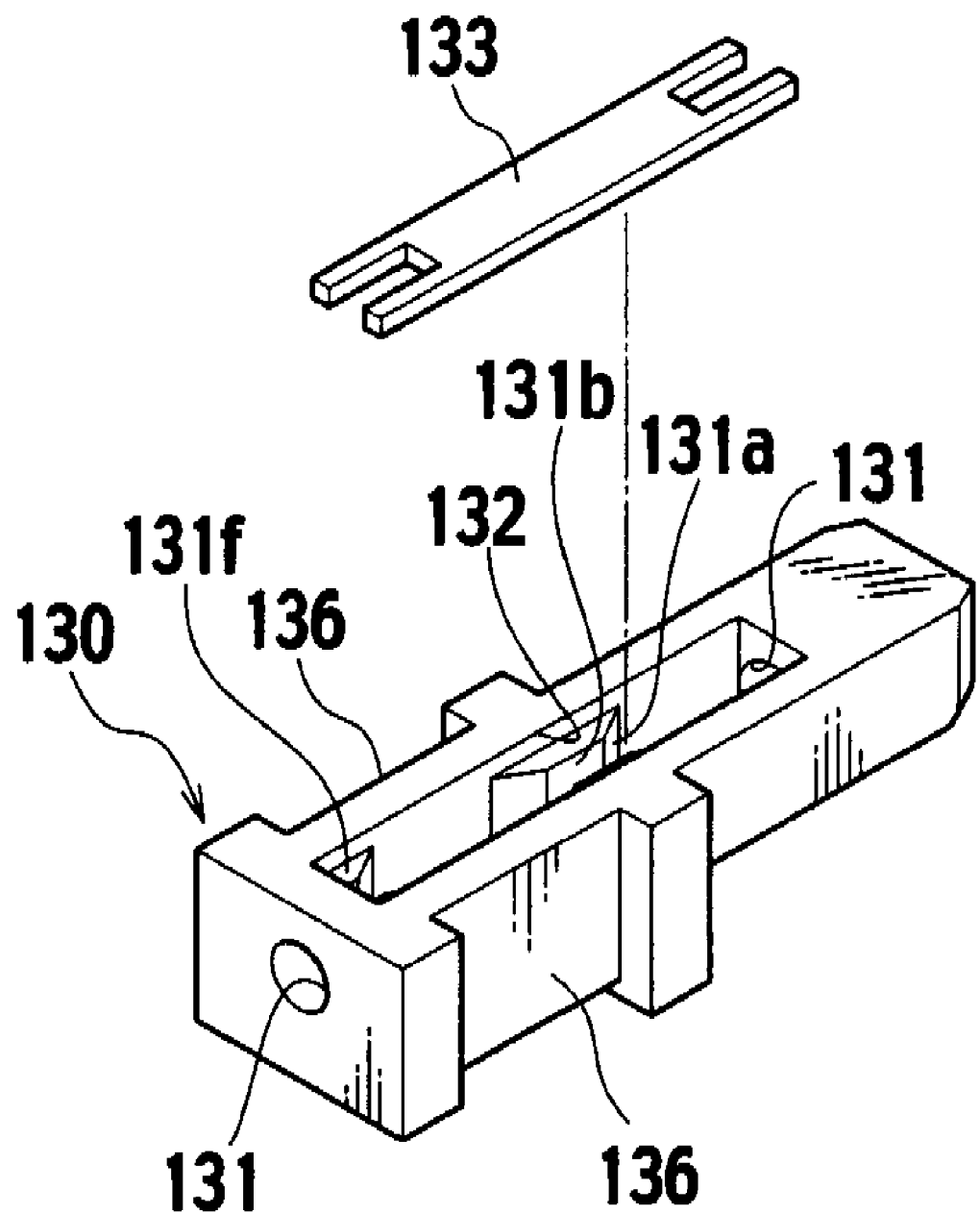
FIG. 22 is a perspective view showing an input-cable fixing member and a cable support plate according to the second exemplary embodiment of the present invention.
Figure 23:
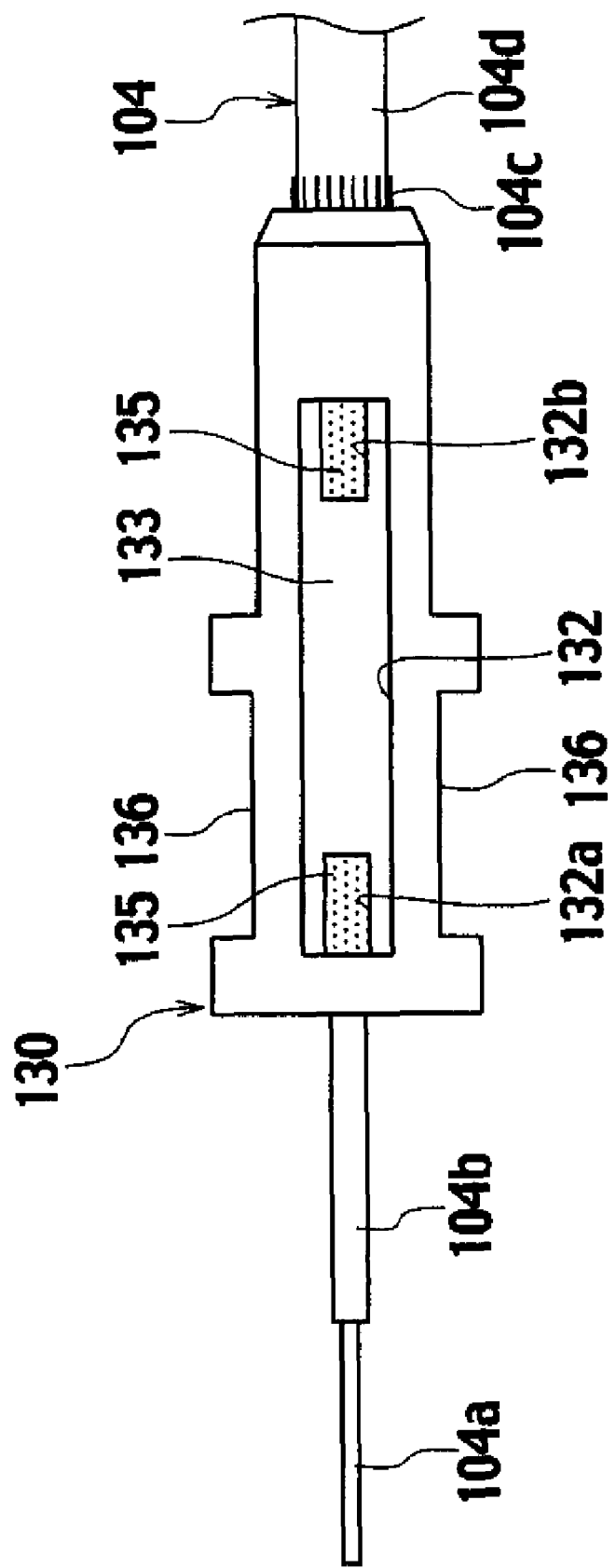
FIG. 23 is a plan view of the input-cable fixing member according to the second exemplary embodiment of the present invention, in which the adhesive is coated on an adhesive coating region of an opening portion.
Figure 24:
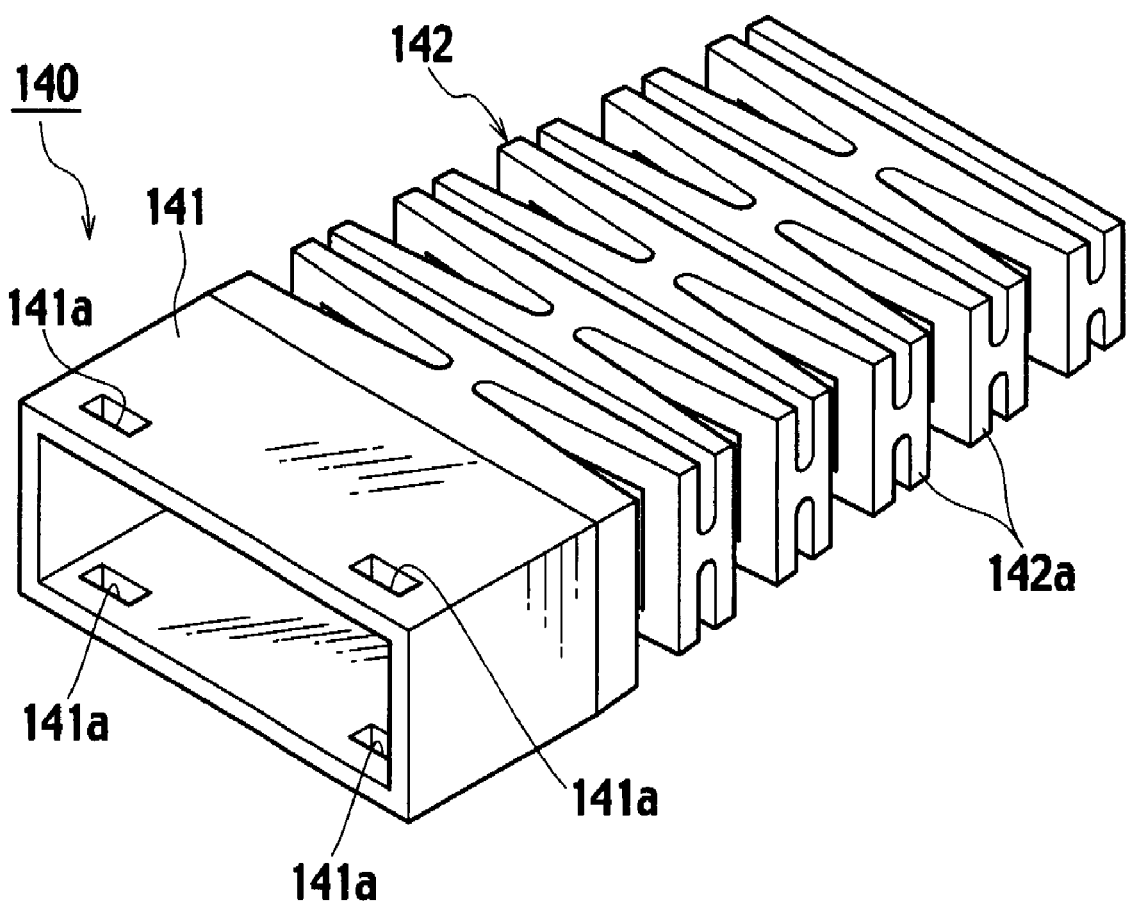
FIG. 24 is a perspective view of an output-cable boot according to the second exemplary embodiment of the present invention.
Figure 25:
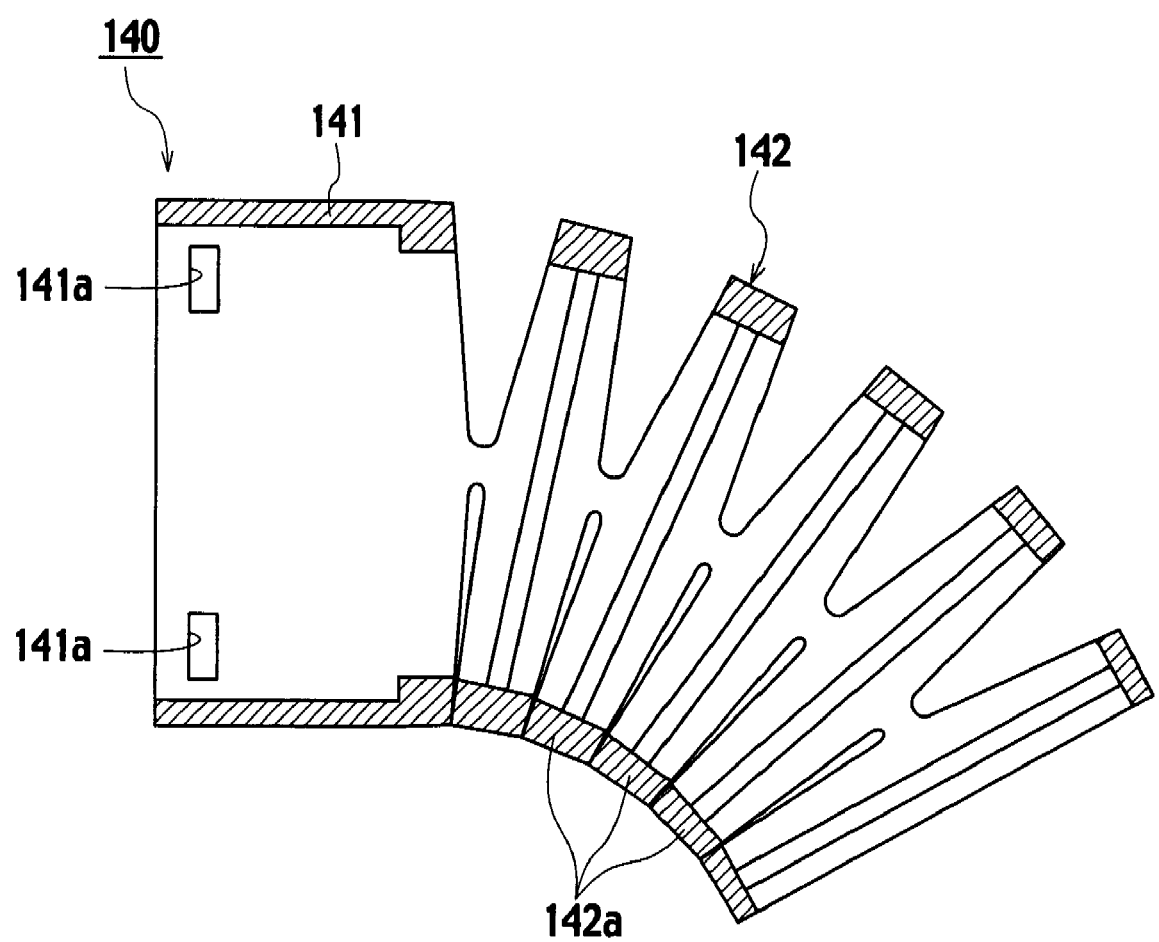
FIG. 25 is a cross-sectional view of an output-cable boot according to an exemplary embodiment of the present invention, which is bent to the maximum in a lateral direction.
Figure 26:
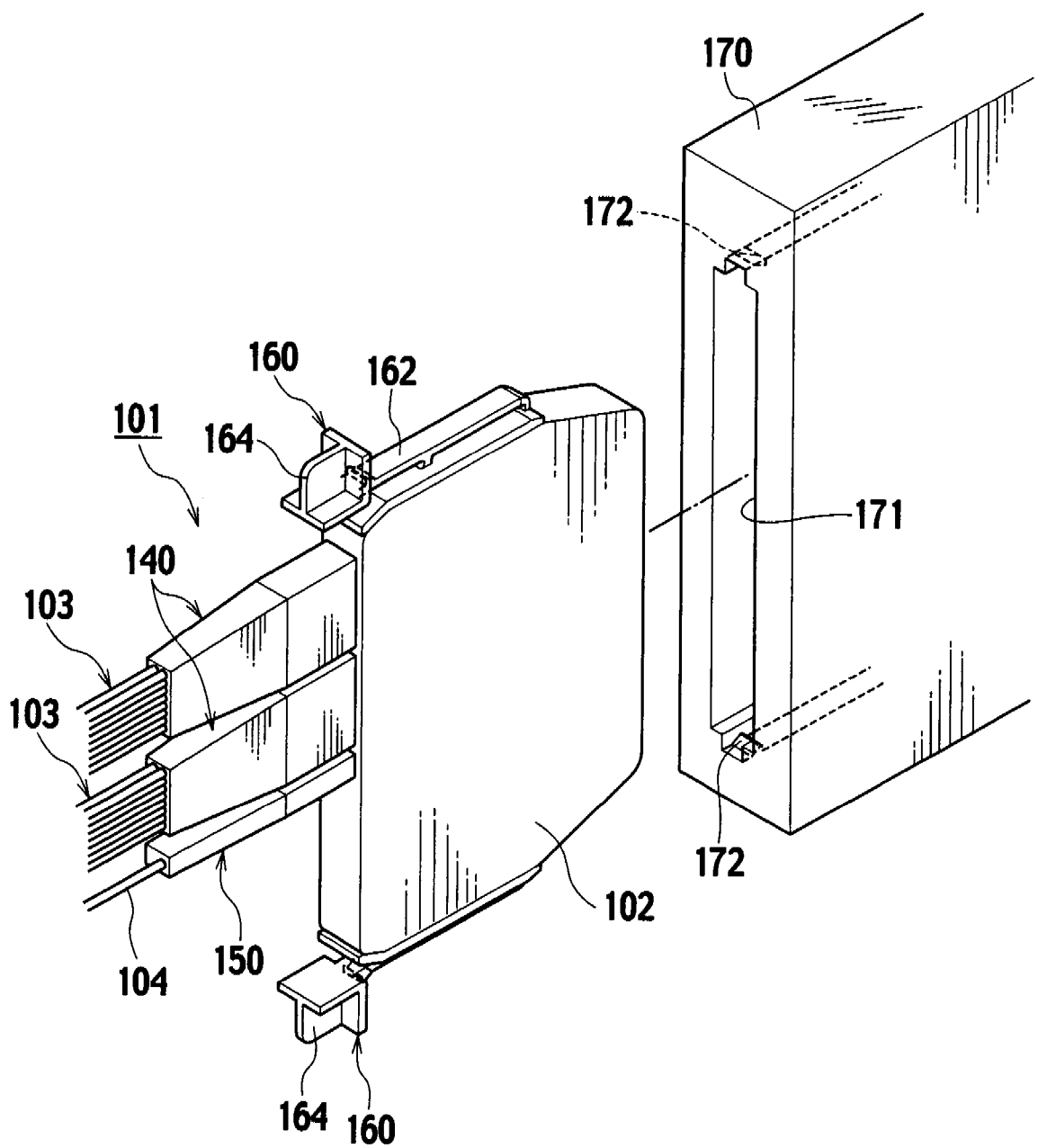
FIG. 26 is a perspective view showing a process according to the second exemplary embodiment of the present invention, in which the optical branching module is attached to a cabinet.

FIG. 14 to FIG. 26 show an exemplary embodiment of the present invention. FIG. 14 is a plan view of an optical branching module from which a cover is detached. FIG. 15A is an enlarged cross-sectional view taken along a line A-A of FIG. 14. FIG. 15B is an enlarged cross-sectional view taken along a line B-B of FIG. 14. FIG. 16 is a exploded perspective view of the optical branching module. FIG. 17 is a front view of a one end of an optical fiber cable (hereinafter, referred to as an optical cable or a cable). FIG. 18 is a perspective view of an output-cable fixing member and a cable support plate. FIG. 19 is a plan view of the output-cable fixing member onto which the cable support plate is attached. FIG. 20 is a plan view of the output-cable fixing member in which cables on an output side are inserted into cable insertion holes. FIG. 21 is a plan view of the output-cable fixing member in which an adhesive is coated on adhesive coating regions of an opening portion. FIG. 22 is a perspective view of an input-cable fixing member and a cable support plate. FIG. 23 is a plan view of the input-cable fixing member in which the adhesive is coated on an adhesive coating region of an opening portion. FIG. 24 is a perspective view of an output cable boot. FIG. 25 is a cross-sectional view of an output cable boot which is bent to the maximum in a lateral direction. FIG. 26 is a perspective view showing a process in which the optical branching module is attached to a cabinet.

It is noted that in the present embodiment, a description will be made particularly of an optical splitter module employing an optical splitter as an optical part in the optical branching module; however, the optical part to be built in the optical branching module is not limited to the optical splitter module.

As shown in FIG. 14 to FIG. 16, an optical branching module 101 includes: a case 102; thirty two output-side cables 103, in which one end of the cables are housed in the case 102, and other portions are drawn out of the case 102; a single input-side cable 104, in which a one-end side is housed in the case 102, and other portions are drawn out of the case 102; an optical splitter 105, an extra fiber length housing member 106, and a fiber support sheet 107, which are housed in the case 102; four output-cable fixing members 120 attached onto the case 102; two input-cable fixing members 130 also attached onto the case 102; two output cable boots 140 which protect the cables 103 on the output side; an input cable boot 150 that protects cable 104 on the input side; and a pair of latch levers 160 fixed to left and right outsides of the case 102.

As shown in FIG. 17 in detail, each of the output-side cables 103 and the input-side cable 104 have the same configuration. The output-side cable 103 and the input-side cable 104 each comprise optical fibers 103a and 104a disposed in centers thereof; plastic-made cylindrical inner tubes 103b and 104b which cover outer circumferences of the optical fibers 103a and 104a; a large number of strength fibers 103c and 104c disposed on outer circumferences of the inner tubes 103b and 104b; and plastic-made cylindrical outer tubes 103d and 104d which cover outer circumferences of the strength fibers 103c and 104c.

In the respective cables 103 and 104, one end is subjected to step peeling, and the optical fibers 103a and 104a, the inner tubers 103b and 104b and the strength fibers 103c and 104c are led out. The strength fibers 103c and 104c exposed from the outer tubes 103d and 104d are folded back from cut surfaces of the outer tubes 103d and 104d. Moreover, optical connectors (not shown) are jointed to the other ends of the respective cables 103 and 104.

Returning to FIG. 14 to FIG. 16, the case 102 has a case body 110, which is a plastic molded article and has a cover 111 which is also a plastic molded article which closes/obturates an opening of the case body 110.

The case body 110 includes: a bottom surface portion 110a; a peripheral wall portion 110b erected from a peripheral edge of the bottom surface portion 110a; and an inner wall portion 110c extended parallel to a part of the peripheral wall portion 110b at a predetermined interval. An optical splitter space 112 is formed by being surrounded by the inner wall portion 110c and the peripheral wall portion 110b. Most of a region on the bottom surface portion 110a surrounded by the peripheral wall portion 110b is composed as an extra fiber length housing space 113 and a parts-use auxiliary space 114. Note that, in the present embodiment, parts are not housed in the parts-use auxiliary space 114.

The peripheral wall portion 110b is not formed over the entire region of the peripheral edge of the bottom surface portion 110a. On spots/portions where the peripheral wall portion 110b is not formed, four engagement protruding portions 110d are erected thereon at an interval. The engagement protruding portions 110d on both ends are provided continuously with the peripheral wall portion 110d. The intermediate engagement protruding portions 110d except on both ends are independent of the peripheral wall portion 110b, and are erected on the bottom surface portion 111a. In the respective intervals between the four engagement protruding portions 110d, two output-side fixing attachment spaces 115 (shown in FIG. 16) and one input-side fixing attachment space 116 (shown in FIG. 16) are composed. The respective fixing attachment spaces 115 and 116 are set at a height at which the output-cable fixing members 120 stacked in two stages and the input-cable fixing members 130 stacked in two stages can be engaged therewith and attached thereonto.

On both sides of the case body 110, lever-engaging recessed portions 110e are provided by using the peripheral wall portion 110b.

The cover 111 is fixed to an upper surface of the peripheral wall portion 110b of the case body 110. The optical splitter 105, the extra fiber length housing member 106, the fiber support sheet 107, the output-cable fixing members 120, and the input-cable fixing members 130, which are housed on the bottom surface portion 110a of the case body 110, are prevented from moving upward by the cover 111.

The optical splitter 105 is housed in the optical splitter space 112. The optical splitter 105 includes a single input portion (not shown) on one end surface thereof, and 32 output portions (not shown) on the other end surface thereof.

An end portion of the single input-side optical fiber 104a is spliced to the single input portion (not shown) by fusing. The thirty two output-side optical fibers 103a are spliced to the 32 output portions (not shown) by fusing. The optical splitter 105 is one of a planar type waveguide, and distributes and outputs a single optical power, which is inputted from the single input-side optical fiber 104a, evenly to the 32 output-side optical fibers 103a.

The extra fiber length housing member 106 is housed in the extra fiber length housing space 113 of the case body 110. The extra fiber length housing member 106 includes: a base portion 106a fixed to the bottom surface portion 110a in an adhered state; and a plurality of winding portions 106b erected on the base portion 106a. The optical fibers 103a and 104a of the output-side and input-side cables 103 and 104 are usually housed in the case 102 by being wound around the plurality of winding portions 106b.

The fiber support sheet 107 is a transparent and thin plastic sheet, and is disposed on an upper surface of the extra fiber length housing member 106. The optical fibers 103a and 104a wound around the extra fiber length housing member 106 are prevented from protruding upward and so on by the fiber support sheet 107.

As shown in FIG. 18 to FIG. 21 in detail, each of the output-cable fixing members 120 is a plastic molded article, and is a substantially flattened rectangular solid. On each of both side surfaces of each output-cable fixing member 120, eight cable insertion holes 121 (hereinafter, referred to as cable insertion holes) are formed at an interval.

The cable insertion holes 121 formed in one of the side surfaces are opposite to the cable insertion holes 121 formed in the other side surface. The cables 103 are inserted between the cable insertion holes 121 opposite to each other.

Walls 121d are provided in order to partition one pair of opposing cable insertion holes 121 from the adjacent pairs of opposing cable insertion holes 121. The walls 121d are erected on a bottom surface of a body of the fixing member 120, and are formed continuously between both side surfaces of the fixing member 120. A thickness of each wall 121d is even except in a thick portion on a center portion thereof. When the cable 103 is inserted between the pair of opposing cable holes 121, the cable end portion is stopped at the thick portion (herein after, refer to stopper). This stopper has upper-and-lower symmetry in FIG. 19, and comprises: two opposite and parallel sides 121b on a center thereof, which are parallel along a left-and-right direction of the page space in the drawing; and inclined sides 121a which are continuous from the two parallel sides 121b toward thin portions of the wall and are inclined with respect to the left-and-right direction.

With the above-described configuration, in the case where each cable 103 is inserted into the opposing cable insertion holes 121, the cable stops when the thick end portion of the cable abuts the inclined sides 121a of the stopper since a cable insertion passage between the one-side wall 121d and the other-side wall 121d adjacent thereto is radically narrow at a spot of the center stopper. Specifically, each cable 103 is inserted to the position where the end surface of the outer tube 103d thrusts against the inclined sides 121a, and specifically, to a position where a basal spot of the folded-back strength fibers 103c thrusts against the inclined sides 121a.

Moreover, on an upper and lower (upper-and-lower direction of the page space in FIG. 19) inner side surfaces of each of the output-cable fixing members 120, protruding portions 121e are formed so as to be opposite to the stoppers of the walls 121d. The protruding portions 121e have the same shape as that of each one-side half body of the stopper, and have a structure to stop the insertion of the cable end portions of the cables 103 in cooperation with the stoppers opposite to the protruding portions 121e concerned.

It is noted that diameters of the cable insertion holes 121 differ from each other between both side surfaces. Such a hole diameter on the left side surface (left side of the page in FIG. 19) is smaller than that on the right side surface (right side of the page in FIG. 19). The diameter of the cable insertion hole 121 on the left side surface is a diameter to an extent where the optical fiber (for example, optical fiber strand) 103a led out of the cable 103 can pass therethrough. In order to guide a tip end of the optical fiber 103a coated with the inner tube 103b, guide pieces 121f having curved surfaces continuous with the cable insertion hole 121 are provided for each cable insertion hole 121.

A plurality of engagement protrusions 124 protrude on upper surfaces of the thick portions of the walls 121d open at an opening portion 122.

A cable support plate 123 is made of metal, and has a plurality of engagement holes 123a at positions corresponding to the plurality of engagement protrusions 124. The respective engagement protrusions 124 are fitted to the respective engagement holes 123a of the cable support plate 123, whereby the cable support plate 123 is fixed to the output-cable fixing member 120. A longitudinal width of the cable support plate 123 is set smaller than a longitudinal width (in an insertion direction of the cables 103 and 104) of the opening portion 122. In such a way, in two spots of the opening portion 122, adhesive coating regions 122a and 122b which are not closed by the cable support plate 123 are formed. An adhesive 125 is applied from the two adhesive coating regions 122a and 122b, and by the adhesive 125, the respective cables 103 are adhered onto the output-cable fixing member 120. With regard to the respective cables 103, spots of the inner tubes 103b are adhered onto the output-cable fixing member 120 in the one adhesive coating region 122a of the opening portion 122. In the other adhesive coating region 122b of the opening portion 122, spots including the folded-back strength fibers 103c are adhered onto the output-cable fixing member 120 by the adhesive 125.

Moreover, engagement recessed portions 126 are provided on both side portions of each of the output-cable fixing members 120. Each of the output-cable fixing members 120 is attached onto the case body 110 in such a manner that a pair of the engagement recessed portions 126 are inserted into the output-side fixing attachment spaces 115 (shown in FIG. 16)

of the case body 110 while being engaged with the engagement protruding portions 110d of the case body 110.

Moreover, boot engagement notches 127 (shown in FIG. 16) are provided on a surface of each output-cable fixing member 120, which is opposite the surface on which the opening portion 122 is formed.

As shown in FIG. 22 and FIG. 23 in detail, each of the input-cable fixing members 130 is a plastic molded article, and is a substantially rectangular solid that is long and slender. In each input-cable fixing member 130, only a single cable insertion hole 131 is formed. Therefore, a width of the input-cable fixing member 130 is set smaller than that of the above-described output-cable fixing member. Similar to the corresponding sides of the output-cable fixing member 120, inclined sides 131a and parallel sides 131b are formed on an inner surface of the input-cable fixing member 130, which is exposed by an opening portion 132, and guide pieces 131f are provided thereon.

No engagement protrusion is formed since a space for forming an engagement protrusion cannot be ensured in the opening portion 132. The cable support plate 133 has a shape substantially like an H, and is fixed to the input-cable fixing member 130 by being fitted into the opening portion 132. By the substantially H-like shape of the cable support plate 133, two adhesive coating regions 132a and 132b are formed in the opening portion 132. Then, in a similar manner to the output-cable fixing member 130, in the one adhesive coating region 132a of the opening portion 132, a spot of the inner tube 104b is adhered onto the input-cable fixing member 130 by an adhesive 135. In the other adhesive coating region 132b of the opening portion 132, a spot including the folded-back strength fibers 104c is adhered onto the input-cable fixing member 130 by the adhesive 135.

In a similar way to the output-cable fixing member 120, engagement recessed portions 136 are provided on both side portions of each input-cable fixing member 130. Each input-cable fixing member 130 is attached onto the case body 110 in such a manner that a pair of the engagement recessed portions 136 are inserted into the input-side fixing attachment spaces 116 (shown in FIG. 16) of the case body 110 while being engaged with the engagement protruding portions 110d of the case body 110.

Moreover, a boot engagement notch 137 (shown in FIG. 16) is provided on a surface of each input-cable fixing member 130, which is opposite to the surface on which the opening portion 132 is formed.

As shown in FIG. 24 and FIG. 25 in detail, the output cable boot 140 is an optical cable boot as described in the first exemplary embodiment and is formed of rubber members, which are: a fixing portion 141 with a rectangular frame shape; and a flexible portion 142 formed integrally with the fixing portion 141. In an inside of the output cable boot 140, sixteen cables 103 drawn out of the case 102 through the output-cable fixing members 120 are housed. Into the fixing portion 141, the output-cable fixing members 120 stacked in two stages are inserted. Engagement holes 141a are formed in upper and lower surface portions of the fixing portion 141. The boot engagement notches 127 of the respective output-cable fixing members 120 are engaged with the engagement holes 141a of the fixing portion 141. In such a way, the output cable boot 140 and the output-cable fixing members 120 stacked in two stages become an integrated article after being assembled and united.

The flexible portion 142 is composed of a large number of flexible swinging leg portions 142a coupled to one another as disclosed in the first embodiment. In the flexible swinging leg portions 142a, the sixteen cables 103 are housed in a predetermined aligned state and without any gap so that mutual aligned positions thereof cannot be changed. As shown in FIG. 25, the flexible portion 142 can be flexibly deformed in the lateral direction to a position where the adjacent swinging leg portions 142a abut one another; however, the flexible portion 142 cannot be flexibly deformed more. In such a way, the flexible portion 142 is configured so as not to be bendable in a radius of curvature smaller than an allowed radius of curvature of the cables 103.

Specifically, the output cable boot 140 cannot be deformed in the radius of curvature smaller than the allowed radius of curvature of the cables 103, and the respective cables 103 in the output cable boot 140 cannot change the mutual aligned positions thereof. In this way, the cables 103 in the output cable boot 140 are not bent in a radius of curvature smaller than the allowed radius of curvature.

As shown in FIG. 14 and FIG. 16, the input cable boot 150 is formed of rubber members, which are: a fixing portion 151 with a square frame shape; and a bending deformation member 152 formed integrally with the fixing portion 151. Into an inside of the fixing portion 151, the input-cable fixing members 130 stacked in two stages are inserted. In upper and lower surface portions of the fixing portion 151, the boot engagement notches 137 of the respective input-cable fixing members 130 are engaged with engagement holes 151a of the fixing portion 151. In such a way, the input cable boot 150 and the input-cable fixing members 130 stacked in two stages become an integrated article after being assembled and united.

Similar to the corresponding elements of the output cable boots 140, the bending deformation member 152 has a large number of flexible swinging leg portions 152a coupled to one another. An inside of the bending deformation member 152 is set at a dimension where two cables 104 are housed in a predetermined aligned state and without any gap so that mutual aligned positions thereof cannot be changed. In this embodiment, only a single cable 104 is housed in the inside of the bending deformation member 152. In a similar manner to the corresponding ones of the output cable boots 140, the flexible portion 152 can be flexibly deformed in the lateral direction to a position where the adjacent swinging leg portions 152a abut one another; however, the flexible portion 152 cannot be flexibly deformed more. In such a way, the flexible portion 152 is configured so as not to be bendable with a radius of curvature smaller than the allowed radius of curvature of the cable 104.

The pair of latch levers 160 are plastic molded articles made of the same plastic material as that of the above-described case 102. As shown in FIG. 14 and FIG. 26, the latch levers 160 include: hook-like engagement portions 161 engaged with the left-and-right pair of lever-engaging recessed portions 110e of the case body 110; elastic arm portions 162 extended integrally from the engagement portions 161; engagement notches 163 provided on outer surfaces of the elastic arm portions 162 in the vicinity of tip ends thereof; and operation portions 164 provided on the tip ends of the elastic arm portions 162.

A description will be made of an example of an assembly procedure of the above-described optical branching module 101, mainly focusing on assembly work of fixing the output-side cables 103 and the input-side cable 104 to the case 102. The description will be made on the assumption that the step peeling (refer to FIG. 17) is performed in advance for the one end of thirty-two output-side cables 103 and the single input-side cable 104.

As shown in FIG. 19, the cable support plate 123 is attached onto the opening portion 122 of the output-cable fixing member 120.

Sixteen output-side cables 103 are inserted into the output cable boot 140 in the aligned state. As shown in FIG. 20, the one-end sides of eight cables 103 among the sixteen cables 103 inserted into the output cable boot 140 are inserted into the respective cable insertion holes 121 of the output-cable fixing member 120. Each cable 103 is inserted to the position where the end surface of the outer tube 103d thrusts against the inclined sides 121a of the cable insertion hole 121.

As shown in FIG. 21, the adhesive is applied from the two adhesive coating regions 122a and 122b of the opening portion 122 of the output-cable fixing member 120. When the adhesive 125 hardens, the fixing work of the output-cable fixing member 120 and the eight cables 103 is completed.

By the same process as above, the other eight cables 103 among the 16 cables 103 inserted into the output cable boot 140 and the other output-cable fixing member 120 are fixed to each other. In such a way, the two output-cable fixing members 120 are fixed to the 16 output-side cables 103.

Next, the two output-cable fixing members 120 are stacked in two stages while matching the mutually different surfaces thereof with each other. The output-cable fixing members 120 stacked in two stages are fitted into the fixing portion 141 of the output cable boot 140, and the integrated article of the output-cable fixing members 120 stacked in two stages and the output cable boot 140 is fabricated.

By the same process as above, another integrated article of the output-cable fixing members 120 stacked in two stages and the output cable boot 140 is fabricated. In such a way, the two integrated articles are fabricated, each of which is formed of the output-cable fixing members 120 stacked in two stages and the output cable boot 140.

Moreover, by substantially the same process as above, the single input-side cable 104 is fixed to the single input-cable fixing member 130. This single input-cable fixing member 130 and another dummy input-cable fixing member 130 to which no cable is fixed are fitted to the input cable boot 150. In such a way, the single integrated article of the two input-cable fixing members 130 and the input cable boot 150 is fabricated.

Next, the tip ends of the optical fibers 103a of the thirty-two output-side cables 103 and the tip end of the optical fiber 104a of the single input-side cable 104 are spliced to the optical splitter 105 by fusing. It is noted that this work may be performed before work of assembling and uniting the output cable boots 140 and the output-cable fixing members 120 or work of assembling and uniting the input cable boot 150 and the input-cable fixing members 130.

As shown in FIG. 14, into the fixing attachment space 115 of the case body 110, the output-cable fixing members 120 stacked on two stages, to which the output cable boot 140 is fixed, are inserted while positionally aligning the engagement protruding portions 110d of the case body 110 with the engagement recessed portions 126 on both sides of the output-cable fixing members 120 concerned. In a similar way, the output-cable fixing members 120 stacked in two stages, to which another output cable boot 140 is fixed, and the input-cable fixing members 130 stacked in two stages, to which the input cable boot 150 is fixed, are also inserted into the respective fixing attachment spaces 115 and 116 of the case body 110.

The extra portions of the optical fibers 103a and 104a between the optical splitter 105 and the output and input-cable fixing members 120 and 130 are housed in the case 102 by being wound around the extra fiber length housing member 106.

The fiber support sheet 107 is attached onto the upper surface of the extra fiber length housing member 106.

Finally, the cover 111 is made to cover the upper surface of the case body 110, and the cover 111 is fixed to the case body 110 by using engaging means. Then, the entire assembly process is completed.

Next, a description will be made of a process for attaching the optical branching module 101 into a cabinet 170 and detaching, from the cabinet 170, the optical branching module attached into the cabinet 170. As shown in FIG. 26, an operator inserts the optical branching module 101 into a housing space 171 of the cabinet 170 in a predetermined orientation. Then, the elastic arm portions 162 of the pair of latch levers 160 make contact with an inner wall of the housing space 171 of the cabinet 170, the elastic arm portions 162 on both sides are flexibly deformed in a direction of narrowing an interval therebetween, and at the same time, the optical branching module 101 is inserted into the housing space 171 of the cabinet 170. When the optical branching module 101 is inserted to an insertion completion position, positions of the both-side engagement notches 163 and positions of the respective engaged portions 172 of the cabinet 170 coincide with each other, the elastic arm portions 162 on both sides are flexibly deformed toward recovering their previous positions, and the respective engagement notches 163 are engaged with the respective engaged portions 172 of the cabinet 170. In such a way, the optical branching member 101 is attached into the cabinet 170 in an engaged state.

When the pair of latch levers 160 are operated by the operator so as to be flexibly deformed in a direction of approaching each other, the engagement between the engagement notches 163 of the both-side elastic arm portions 162 and the engaged portions 172 of the cabinet 170 is released. When the operator pulls the optical branching module 101 out of the housing space 171 of the cabinet 170 while maintaining such a released state, the optical branching module 101 can be detached from the cabinet 170.

As above, the above-described optical branching module 101 includes: the case 102 from which the cables 103 and 104 are drawn out; and the output and input-cable fixing members 120 and 130, which are provided in the case 102 and fix the spots of the cables 103 and 104 housed in the case 102 by the adhesives 125 and 135. Accordingly, when the pulling force is applied to the cables 103 and 104, the pulling force is received by adhesive force of the adhesives 125 and 135, which is far stronger than adhesive force of an adhesive tape. Because of this, the optical branching module has strong fixing force for the cables 103 and 104.

The cables 103 and 104 are drawn out of the case 102 of the optical branching module 101. The step peeling is performed so as to expose the strength fibers 103c and 104c of the cables 103 and 104. Moreover, at least the strength fibers 103c and 104c are fixed to the output and input-cable fixing members 120 and 130 by the adhesives 125 and 135. Hence, even if the pulling force is applied to the cables 103 and 104, the outer tubes 103d and 104d of the cables 103 and 104 do not come off, and tensile strengths of the cables 103 and 104 themselves can also be ensured.

The output and input-cable fixing members 120 and 130 are separate bodies from the case body 110, and are assembled to the case 102. Hence, the end portions of the cables 103 and 104 can be fixed to the output and input-cable fixing members 120 and 130, which are separate bodies from the case 102. Accordingly, before assembling the cables 103 and 104 to the case 102, for example, a fusion splicing process is possible between the optical splitter 105 and the tip ends of the cables 103 and 104, and workability is enhanced. In particular, in the present embodiment, the output and input-cable fixing members 120 and 130 can be attached onto the case body 110 by being simply inserted thereinto. Accordingly, the output and input-cable fixing members 120 and 130 are good in terms of ease of assembly.

The output and input-cable fixing members 120 and 130 are configured so as to include the cable insertion holes 121 and 131 into which the cables 103 and 104 are inserted, and in addition, to include the opening portions 122 and 132 which open the cable insertion holes 121 and 131, and to apply the adhesives 125 and 135 from the opening portions 122 and 132. Hence, when the number of cables 103 to be fixed is large as in the output-cable fixing members 120, the large number of cables 103 are inserted into the cable insertion holes 121, whereby the cables 103 can be temporarily arranged by being aligned at the predetermined interval. Accordingly, workability of adhering the adhesive 125 and so on is good. Moreover, when the number of cables 103 is large, the adhesive 125 easily provides adhesion since all the cables 103 can be adhered by the opening portion 122 at once. Furthermore, the adhered regions of the adhesive 125 can be set at a desired dimension in accordance with the dimension of the opening portion 122, and accordingly, highly reliable adhesion can be performed.

In the present embodiment, the output and input-cable fixing members 120 and 130 are attached onto the case 102 each in a stacked shape. Hence, pairs of the output-cable fixing members 120 and the input-cable fixing members 130 can be attached onto case 102 while saving spaces therefor, and accordingly, the optical branching module 101 can be made compact. Moreover, the large number of cables 103 and 104 can be drawn out in a high density. It is noted that the output and input-cable fixing members 120 and 130 may be configured to be attached onto the case 102 in only a single stage, or may be configured to be attached onto the case 102 in a state of being stacked in three or more stages.

In the present embodiment, the optical branching module 101 includes the output and input cable boots 140 and 150 which house the cables 103 and 104 drawn out of the case 102 to the outside. Hence, the portions of the cables 103 and 104 drawn out of the case 102 are protected by the output and input cable boots 140 and 150. Moreover, each of the output cable boots 140 is configured so as to house the cables 103, which are drawn out of the case 102 to the outside, in the aligned state and without any gap so that the mutual aligned positions thereof cannot be changed, and so as not to bend the cables 103 in a radius of curvature smaller than the allowed radius of curvature thereof in order to prevent optical transmission losses.

In the present embodiment, the output and input cable boots 140 and 150 are integrally fixed to the output and input-cable fixing members 120 and 130 stacked in a shape of two stages. Hence, the output-cable fixing members 120 stacked in two stages and the single output cable boot 140, or the input-cable fixing members 130 stacked in two stages and the single input cable boot 150 can be handled as the integrated article. Accordingly, the workability of attaching the output and input-cable fixing members 120 and 130 stacked in two stages onto the case 102 is good. In addition, when the output and input-cable fixing members 120 and 130 stacked on two stages are attached onto the case 102, the output and input cable boots 140 and 150 are supported on the case 102 through the output and input-cable fixing members 120 and 130. Accordingly, it is not necessary to provide a structure for supporting the output and input cable boots 140 and 150 on the case 102.

It is noted that the output and input cable boots 140 and 150 may be configured to be integrally fixed to the output and input-cable fixing members 120 and 130 in the single stage, or may be configured to be integrally fixed to the output and input-cable fixing members 120 and 130 stacked in three or more stages.

In the present embodiment, the optical branching module 101 includes the latch levers 160 operatable to be engaged with the engaged portions 172 of the cabinet 170 at the position where the optical branching module 101 is inserted to the insertion completion position of the cabinet 170, and to release the engagement with the engaged portions 172. Hence, only by inserting the optical branching module 101 into the cabinet 170, the optical branching module 101 can be attached into the cabinet 170 in an engaged state. Moreover, the optical branching module 101 attached to the cabinet 170 can be released from the engagement therewith by operating the latch levers 160. In such a way, the optical branching module 101 can be easily detached from the cabinet 170.

In this embodiment, though the number of input-side cables 104 in the optical branching module 101 is one, the number can be easily set at two by using the dummy input-cable fixing member 130. In this case, the tip ends of the optical fibers 104a of the two cables 104 are spliced to the optical splitter 105 through a 1×2 coupler. Then, the 1×2 coupler and fused portions following the same are housed in the parts-use auxiliary space 114.

In the present embodiment, the pair of latch levers 160 are formed as separate bodies from the case body 110; however, they may be formed of the same material as that of the case body 110 or the cover 111 and be integrally molded with the case body 110 or the cover 111.

In an exemplary embodiment of the present invention, the optical branching module 101 can be used to evenly distribute the optical power of the incident light, to distribute the optical power of the incident light in a certain ratio, to divide an optical wavelength of the incident light (wavelength division multiplexing), and the like.

EXEMPLARY ADVANTAGES OF THE INVENTION

In accordance with an optical branching module of an exemplary embodiment of the present invention, when the pulling force is applied to the optical cables, the pulling force may be received by the adhesive force of the adhesives far stronger than the adhesive force of the adhesive tape. A structure may be used, which fixes the tip ends of the optical cables by the cable fixing members by means of the adhesive, and fix the cable fixing members to the optical branching module. Hence, an optical branching module in which the fixing force for the optical cables is strong can be provided.

In particular, the strength fibers of the optical cables and the cable fixing members are fixed to each other with adhesive interposed therebetween. Accordingly, the tensile strength of the optical cables themselves against the pulling force can also be ensured.

Moreover, since the end portions of the optical cables can be fixed to the cable fixing members as separate bodies from the case, before assembling the optical cables to the case, for example, it is possible to fusion splice the tip ends of the optical cables to the other housed optical parts, and the workability of assembling the optical connection parts may be enhanced.

Furthermore, when the number of optical cables is large, the large number of cables are inserted into the cable insertion holes, whereby the cables can be temporarily arranged by being aligned at the predetermined interval, and accordingly, the adhering work of the adhesive, may be improved. Moreover, when the number of optical cables is large, the adhesive can easily adhere since all the cables can be adhered to the opening portion at once. Furthermore, the adhered regions of the adhesive can be set at the desired dimension in accordance with the dimension of the opening portion, and accordingly, highly reliable adhesion can be performed.

In accordance with exemplary embodiments of the present invention, the plurality of cable fixing members can be attached onto the case while saving the spaces therefor, and accordingly, the optical branching module can be made compact. Moreover, the large number of optical cables can be drawn out in a high density.

Moreover, in accordance with exemplary embodiments of the present invention, the two cable fixing members can be attached onto the case while saving the spaces therefor, and accordingly, the optical branching module can be made compact. Moreover, the large number of optical cables can be drawn out in a high density.

Furthermore, in accordance with exemplary embodiments of the present invention, the portions of the optical cables drawn out of the case are protected by the cable boots. Moreover, the cable boots may prevent the optical cables from bending in a radius of curvature smaller than the allowed radius of curvature thereof, and accordingly, the optical transmission losses can be decreased.

The one of plurality of cable fixing members and the single cable boot can be handled as an integrated article, and accordingly, attaching the plurality of cable fixing members onto the case may be facilitated. When the plurality of cable fixing members are attached onto the case, the cable boots are supported on the case 102 through the cable fixing members, and accordingly, it is not necessary to provide structure for supporting the cable boots on the case.

Furthermore, in accordance with exemplary embodiments of the present invention, only by inserting the optical branching module into the cabinet, the optical branching module can be attached into the cabinet in the engaged state. The optical branching module attached into the cabinet can be released from the engagement therewith by operating the latch levers. In such a way, the optical branching module can be easily detached from the cabinet.

Although the invention has been described above by reference to exemplary embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An optical cable boot comprising:
    a plurality of unit structures integrally coupled and a fixing portion;
    wherein each unit structure comprises:
        a first cover portion having a cylindrical shape;
        an insertion hole formed in the first cover portion through which a plurality of optical fibers are insertable;
        a second cover portion having a cylindrical shape;
        an insertion hole formed inside the second cover portion through which the plurality of optical fibers are insertable; and
        a first coupling portion that couples the first cover portion and the second cover portion to each other so that the first cover portion and the second cover portion are freely rotatable about the first coupling portion, and such that a first pair of slits sandwiching the first coupling portion therebetween is formed in which a width of each slit is gradually increased from the first coupling portion toward an outer circumference of the unit structure;
    wherein the plurality of unit structures are coupled to one another along an axial direction of the optical fibers, such that
        between unit structures adjacent to each other, the first cover portion of one unit structure and the second cover portion of an adjacent unit structure are integrally coupled to each other through a second coupling portion so that the first cover portion of the one unit structure and the second cover portion of an adjacent unit structure are freely rotatable about the second coupling portion, such that a second pair of slits sandwiching the second coupling portion therebetween is formed in which a width of each slit is gradually increased from the second coupling portion toward an outer circumference of the plurality of unit structures coupled to one another;
    wherein the fixing portion has a cylindrical shape and is formed integrally with one of the first cover portion or the second cover portion of a unit structure at an end of the plurality of unit structures coupled to one another.

2. The optical cable boot of claim 1 wherein
    the first coupling portion couples first side walls of the first cover portion and the second cover portion to each other, and
    the second coupling portion couples second side walls of the first cover portion and the second cover portion to each other.

3. The optical cable boot of claim 2 wherein
    the first pair of slits formed on the first side walls have a V-shape.

4. The optical cable boot of claim 1 wherein
    a partition frame is provided on an end portion of the unit structures coupled to one another, and an inside of the partition frame is partitioned into a plurality of the insertion holes by a partition wall.

5. The optical cable boot of claim 4 wherein
    a plurality of the partition frames are formed inside the first coupling portions.

6. An attachment structure of the optical cable boot of claim 1 wherein
    the second side walls are wider than the first side walls, and the optical cable boot is attached to an optical instrument so that a direction in which the first side walls are extended is a main bending direction of the optical fibers.

7. An optical branching module comprising:
    a case from which optical cables extend, the case comprising a case body, and a cover obturating an opening surface of the case body; and
    a cable fixing member attached onto the case, the cable fixing member comprising cable insertion holes, and an opening portion that defines the cable insertion holes, wherein:
    end sides of the optical cables are inserted into the cable insertion holes of the cable fixing member; and at least portions of the optical cables comprising strength fibers are adhered onto the cable fixing member by an adhesive portion of the opening portion of the cable fixing member.

8. The optical branching module of claim 7 wherein a plurality of the cable fixing members are attached onto the case in a stacked shape in plural stages.

9. The optical branching module of claim 8 wherein the cable fixing members are stacked in two stages.

10. The optical branching module of claim 7, further comprising an optical cable boot configured to house the optical cables, which are extend from the case, in an aligned state adjacent to each other so that mutual aligned positions of the optical cables cannot be changed, and configured not to bend with a radius of curvature smaller than an allowed radius of curvature of the optical cables, wherein the cable boot is fixed to the cable fixing member in a single stage or to the cable fixing members stacked in plural stages.

11. An optical branching module comprising:

a case from which optical cables extend, the case comprising a case body, and a cover obturating an opening surface of the case body; and a cable fixing member attached onto the case, the cable fixing member comprising cable insertion holes, and an opening portion that defines the cable insertion holes, wherein:

end sides of the optical cables are inserted into the cable insertion holes of the cable fixing member;

at least portions of the optical cables comprising strength fibers are adhered onto the cable fixing member by an adhesive portion of the opening portion of the cable fixing member; and an optical cable boot according to claim 1, wherein the cable boot is fixed to the cable fixing member in a single stage or to the cable fixing members stacked in plural stages.

12. The optical branching module of claim 7, further comprising a latch lever operatable to be engaged with an engaged portion of a cabinet when the optical branching module is inserted to an insertion completion position of the cabinet, and operatable to release the engagement with the engaged portion.

\* \* \* \* \*